(12) United States Patent
Kuwahara

(10) Patent No.: US 11,194,624 B2
(45) Date of Patent: Dec. 7, 2021

(54) PARTIAL ORDER PROCEDURE PLANNING DEVICE, PARTIAL ORDER PROCEDURE PLANNING METHOD AND PARTIAL ORDER PROCEDURE PLANNING PROGRAM

(71) Applicant: NEC Corporation, Tokyo (JP)

(72) Inventor: Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 67 days.

(21) Appl. No.: 16/616,046

(22) PCT Filed: May 14, 2018

(86) PCT No.: PCT/JP2018/018467
§ 371 (c)(1),
(2) Date: Nov. 22, 2019

(87) PCT Pub. No.: WO2018/221175
PCT Pub. Date: Dec. 6, 2018

(65) Prior Publication Data
US 2020/0089531 A1 Mar. 19, 2020

(30) Foreign Application Priority Data
May 30, 2017 (JP) .............................. JP2017-106367

(51) Int. Cl.
G06F 9/46 (2006.01)
G06F 9/48 (2006.01)
G06F 9/52 (2006.01)

(52) U.S. Cl.
CPC ............ G06F 9/4881 (2013.01); G06F 9/463 (2013.01); G06F 9/528 (2013.01)

(58) Field of Classification Search
CPC ........ G06F 9/4881; G06F 9/463; G06F 9/528; G06Q 10/0631
See application file for complete search history.

(56) References Cited

U.S. PATENT DOCUMENTS

| 5,528,513 A | * | 6/1996 | Vaitzblit | ........... H04L 29/06027 |
| | | | | 348/E7.073 |
| 5,954,790 A | * | 9/1999 | Wong | ...................... G06F 7/485 |
| | | | | 708/505 |
| 2008/0184196 A1 | | 7/2008 | Kataoka | |
| 2010/0083185 A1 | * | 4/2010 | Sakai | ...................... G06F 8/433 |
| | | | | 715/853 |

(Continued)

FOREIGN PATENT DOCUMENTS

| JP | H05-233597 A | 9/1993 |
| JP | 2004-005368 A | 1/2004 |

(Continued)

OTHER PUBLICATIONS

Mokhov, Andrey et al. "Conditional Partial Order Graphs and Dynamically Reconfigurable Control Synthesis". EDAA. (Year: 2008).*

(Continued)

Primary Examiner — Adam Lee
(74) Attorney, Agent, or Firm — Sughrue Mion, PLLC

(57) ABSTRACT

A partial order procedure planning device 10 is provided with: a first generation unit 11 which generates a first condition of a removable order relationship under a predetermined restriction among order relationships between operations in a serial procedure in which a plurality of operations, which transit the state of a state element from an initial state to a target state, are arranged in series; a second generation unit 12 which generates a second condition of an order relationship, which is required to satisfy a transient requirement that is required to satisfy the state element while a state among the order relationships is transitioned from the initial state to the target state; and a determination unit 13 which determines, as the order relationship to be deleted from the serial procedure, an order relationship which satisfies the generated first condition, but does not satisfy the generated second condition.

14 Claims, 26 Drawing Sheets

(56) References Cited

U.S. PATENT DOCUMENTS

| | | | |
|---|---|---|---|
| 2010/0162256 A1* | 6/2010 | Branover | G06F 1/3203 |
| | | | 718/104 |
| 2010/0242042 A1* | 9/2010 | Bansal | G06F 9/5066 |
| | | | 718/104 |
| 2014/0068623 A1* | 3/2014 | Emasa | G06F 9/4881 |
| | | | 718/103 |
| 2015/0105961 A1* | 4/2015 | Callow | G05D 1/021 |
| | | | 701/23 |
| 2015/0324211 A1 | 11/2015 | Kuroda et al. | |
| 2017/0039501 A1* | 2/2017 | Deguchi | G06Q 10/06316 |

FOREIGN PATENT DOCUMENTS

| | | |
|---|---|---|
| JP | 2008-186244 A | 8/2008 |
| JP | 2014-115960 A | 6/2014 |

OTHER PUBLICATIONS

Naumovich, Gleb et al. "Using Partial Order Techniques to Improve Performance of Data Flow Analysis Based Verification". ACM Paste. (Year: 1999).*

Vercauteren, Steven et al. "Efficient Verification using Generalized Partial Order Analysis". IEEE. (Year: 1998).*

International Search Report for PCT Application No. PCT/JP2018/018467, dated Jun. 5, 2018.

Christian Muise, Sheila A. McIlraith, and J. Christopher Beck, "Optimally Relaxing Partial-Order Plans with MaxSAT," ICAPS' 12. Canada.

* cited by examiner

FIG. 4

SCORE ASSIGNMENT

| STATE ELEMENT | STATE | SCORE |
|---|---|---|
| A, B | a | 0 |
| | b | 1 |
| | c | -1 |

RESTRICTION EXPRESSION

Score(Me) < 2

FIG. 7

FIRST RESTRICTION:

REGARDING THREE SETS OF VARIABLES: $\beta(a \to b)$, $\beta(b \to c)$, AND $\beta(a \to c)$,
$\beta(a \to b) \land \beta(b \to c) \Rightarrow \beta(a \to c)$ HOLDS

SECOND RESTRICTION:

WHEN E IS STATE ELEMENT AND s IS STATE OF E,
$Y(b,a,E,s) \Rightarrow \beta(a \to d) \lor \beta(d \to b)$ IS ESTABLISHED REGARDING
ALL TASKS a DEPENDING ON s,
ALL TASKS b THAT "ALLOWS TRANSITION OF STATE OF E TO s", AND
ALL TASKS d THAT "ALLOWS TRANSITION OF STATE OF E FROM s"

$$\bigvee_{b = E\_ \to s} Y(b,a,E,s)$$

= "TASK THAT 'ALLOWS TRANSITION OF STATE OF E TO s'
HOLDS FOR ALL TASKS a AND ALL TASK DEPENDENCIES E.s

FIG. 14

$0 \leq f(a \rightarrow b) \leq c(a \rightarrow b)$ HOLDS FOR ALL FLOW VARIABLES $f(a \rightarrow b)$ WHEN CAPACITY OF EDGE $a \rightarrow b$ IS $c(a \rightarrow b)$ (INTEGER CONSTANT VALUE)

$$\sum_{e \in in(a)} f(e) - \sum_{e \in out(a)} f(e) = 0$$

HOLDS FOR ALL NODES a WHEN SET OF ALL EDGES DIRECTED OUTWARD FROM NODE a IS out(a), AND WHEN SET OF ALL EDGES DIRECTED INTO NODE a IS in(a)

FIG. 25

RELATED ART

| STATE ELEMENT | STATE | SCORE |
|---|---|---|
| ServiceA, ServiceB, ServiceC, ServiceD | ON | 1 |
| | OFF | 0 |
| ConfigA, ConfigB, ConfigC, ConfigD | OLD | 0 |
| | NEW | 0 |

FIG. 26

RELATED ART

SCORE ASSIGNMENT

| STATE ELEMENT | STATE | SCORE |
|---|---|---|
| ServiceA, ServiceC | ON | 100 |
| | OFF | 0 |
| ServiceB, ServiceD | ON | 300 |
| | OFF | 0 |
| ConfigA, ConfigB, ConfigC, ConfigD | OLD | 0 |
| | NEW | 0 |

RESTRICTION EXPRESSION

Score(PAR_UPDATE)≥400

PARTIAL ORDER PROCEDURE PLANNING DEVICE, PARTIAL ORDER PROCEDURE PLANNING METHOD AND PARTIAL ORDER PROCEDURE PLANNING PROGRAM

This application is a National Stage Entry of PCT/JP2018/018467 filed on May 14, 2018, which claims priority from Japanese Patent Application 2017-106367 filed on May 30, 2017, the contents of all of which are incorporated herein by reference, in their entirety.

TECHNICAL FIELD

The present invention relates to a partial order procedure planning device, a partial order procedure planning method, and a partial order procedure planning program, and more particularly to a partial order procedure planning device, a partial order procedure planning method, and a partial order procedure planning program for planning a partial order procedure that is used for solving an automated planning problem and that satisfies a predetermined condition.

BACKGROUND ART

Automated planning technology is a technology that determines a target action to be executed next on the basis of known environmental information and that further constructs an execution plan (hereinafter simply referred to as a "procedure") of a series of actions until the objective is achieved. The automated planning technology is executed by artificial intelligence, for example. Artificial intelligence that preliminarily computes future actions uses automated planning technologies for the purpose of planning a computed action procedure.

Automated planning problems for obtaining the above procedure include a problem having a plurality of action subjects (hereinafter referred to as "agents"). When solving an automated planning problem having a plurality of agents, artificial intelligence sets up a procedure in which no order relationship is defined between actions that the plurality of agents can execute in parallel, instead of a procedure in which an order relationship is defined between all actions.

That is, using a procedure that can simultaneously execute a plurality of actions enables execution of a series of actions with higher efficiency. Hereinafter, a procedure in which all actions are linearly aligned in time series will be referred to as a "serial procedure". In contrast, a procedure in which an order relationship is not defined between some actions will be referred to as a "partial order procedure".

FIG. 18 is an explanatory diagram showing an example of an automated planning problem including a plurality of execution agents. The automated planning problem shown in FIG. 18 deals with an example in which four agents, Agent A, Agent B, Agent C, and Agent D, operate simultaneously.

Each of Agent A, Agent B, Agent C, and Agent D temporarily stops each of service SA, service SB, service SC, and service SD, respectively, and updates a configuration file for each of the services. When the update is completed, each of the agents restarts each of the services. As shown in FIG. 18, each of the services runs on a separate server.

Regarding the automated planning problem shown in FIG. 18, for example, there is a conceivable operation plan with a "serial procedure" in which Agent A, Agent B, Agent C, and Agent D perform operation in series in accordance with the procedure described above. FIG. 19 is an explanatory diagram showing an example of the serial procedure.

When the serial procedure shown in FIG. 19 is used, four agents sequentially perform update operation. Note that the rectangle shown in FIG. 19 represents an action. An arrow extending from an action to another action represents an order relationship in which another action is started after completion of a certain action.

The serial procedure shown in FIG. 19 includes 12 actions. Each of agents executes a set of operations with three actions, namely "stop service", "update configuration file", and "start service". When the serial procedure shown in FIG. 19 is used, the above operations will be executed in the order of Agent A, Agent B, Agent C, and Agent D.

Meanwhile, regarding the automated planning problem shown in FIG. 18, in a case where each of four agents can execute the above operation completely independently, there is a conceivable operation plan with a "partial order procedure" in which four agents perform each of operations in parallel. FIG. 20 is an explanatory diagram showing an example of a partial order procedure.

When the partial order procedure shown in FIG. 20 is used, four agents perform update operation in parallel. In FIG. 20, four sets in which three actions are connected by arrows in the order of "stop service", "update configuration file", and "start service" are shown in parallel.

That is, when the partial order procedure shown in FIG. 20 is used, a restriction that the operation is to be performed in the order of "stop service", "update configuration file", and "start service" will be imposed on each of the agents. Still, each of agents can proceed with operation independently without being affected by the operation of other agents. Accordingly, using the partial order procedure shown in FIG. 20 enables completion of all operations in shorter time than in when using the serial procedure shown in FIG. 19.

For example, there are the following two methods for deriving a partial order procedure. The first method is partial-order planning (POP) in which a solution of an automated planning problem is set up as a partial order procedure from the beginning. The second method is partial ordering (deordering) that removes unnecessary order relationships after initially planning a serial procedure.

In general, the order of actions in an automated planning problem depends on the restrictions imposed on each of related components in order to allow transition of the component to a state where each of actions is executable. A component corresponds to a part included in a system.

For example, the action "update the configuration file of a service SA" is an action that is not to be executed unless the state of the service SA is stopped. That is, the action "update the configuration file of the service SA" depends on the state of one component, namely, the service SA.

Automated planning problems include a problem that requires consideration of global restrictions imposed on an entire system in addition to the restrictions imposed on each of components described above.

For example, there is an assumable situation, in the automated planning problem shown in FIG. 18, where all four servers provide the same service and operation of at least two of the service SA, service SB, service SC, and service SD would ensure minimum service quality as a whole.

In a case where minimum service quality need to be ensured even during the update operation of the four services, there would be a requirement that "the service state need to be always in operation in at least two servers during the update operation" imposed on the automated planning problem shown in FIG. 18.

The above restriction is not a component-related restriction but a restriction on the state of the entire system formed of four services. In other words, the above restriction can be considered to be a restriction that imposes a requirement that "the service state is an operating state in at least two servers" on the entire system state from the start of the first action to the completion of the last action. Hereinafter, the above-described restriction that is always required to be satisfied by the state of the entire system that transitions with the execution of the procedure will be referred to as a "transient requirement".

In a case where the above transient requirement is given, the action plan of the partial order procedure shown in FIG. 20 is not a correct action plan. The reason is that, for example, the Agent C might stop the service SC while the Agent A and the Agent B are simultaneously updating the configuration file.

FIG. 21 is an explanatory diagram showing another example of a partial order procedure. In the use of the partial order procedure shown in FIG. 21, four agents perform the update operation while satisfying the transient requirement "service state is in an operation state with at least two servers".

For example, as shown in FIG. 21, the order relationship is determined such that Agent B waits until completion of the operation of Agent A so as to avoid simultaneous operation of Agent A and Agent B. Similarly, the order relationship is determined such that Agent D waits until completion of the operation of Agent C so as to avoid simultaneous operation of Agent C and Agent D.

That is, executing the operation in accordance with the partial order procedure shown in FIG. 21 enables completion of the operation, by each of agents, without violating the transient requirements. The partial order procedure shown in FIG. 21 is a procedure that satisfies the transient requirement.

Automated planning problems are often solved after being modeled. In the following, the modeling of automated planning problems will be described.

For example, as shown as the automated planning problem described in Patent Literature (PTL) 1, the automated planning problem can be reduced to a planning problem for obtaining a procedure for transitioning the state of all the state graphs to a target state on a model including an arrangement of a plurality of state graphs in which the initial state and the target state are specified. Hereinafter, a model including an arrangement of a plurality of state graphs will be referred to as a state element model. The state graph constituting the state element model will be referred to as a state element.

Each of state elements takes one of states corresponding to the node of its own state graph. The state of a state element transitions along a directed edge in a state graph. The current state of a state element at a predetermined time point has a role of a pointer that indicates the state of each of the state graphs at a predetermined time point. For example, the current state first indicates the initial state.

Hereinafter, a specific example of the state element model will be described. FIG. 22 is an explanatory diagram showing an example of a state element model. A state element model PAR_UPDATE shown in FIG. 22 is a modeled automated planning problem shown in FIG. 18. That is, the state element model PAR_UPDATE represents a situation in which four agents perform update operation.

Each of rectangles described as ConfigA, ConfigB, ConfigC, ConfigD, ServiceA, ServiceB, ServiceC, and ServiceD shown in FIG. 22 corresponds to a state element. Each of ellipses described as OLD, NEW, ON, and OFF in each of state elements corresponds to a state. Each of arrows connecting the states corresponds to a state transition.

A double ellipse corresponds to the initial state. The black ellipse corresponds to the target state. For example, the state element ConfigA includes one initial state and one target state.

Note that the initial state and the target state are not necessarily present as separate states in the state element. For example, the state element ServiceA includes state ON that is an initial state as well as a target state.

State elements ServiceA to ServiceD shown in FIG. 22 represent services SA to service SD modeled as state elements, respectively. As shown in FIG. 22, the state element ServiceA to the state element ServiceD are state graphs each including two states: state OFF representing a stopped state; and state ON representing an operating state.

As shown in FIG. 22, operation of starting a service is modeled as a state transition from state OFF to state ON. Operation of stopping the service is modeled as a state transition from state ON to state OFF. Each of the initial states and each of the target states of the state element ServiceA to the state element ServiceD are state ON in individual cases.

Furthermore, state elements ConfigA to ConfigD shown in FIG. 22 respectively represent configuration files of services SA to SD modeled as state elements. As shown in FIG. 22, each of state elements ConfigA to state element ConfigD is a state graph including two states, state OLD representing an old version file and state NEW representing a new version file.

As shown in FIG. 22, the configuration file update operation is modeled as a state transition from the state OLD to the state NEW. In each of the state element ConfigA to the state element ConfigD, each of initial states is state OLD, and each of target states is state NEW.

Furthermore, the state element model describes details of interference between the state elements. For example, a black balloon attached to an arrow representing the state transition shown in FIG. 22 represents details of interference between state elements (hereinafter referred to as "dependency").

As shown in FIG. 22, "ServiceA: OFF" is described in the dependency accompanying the state transition from state OLD to state NEW of the state element ConfigA. That is, the dependency "ServiceA: OFF" means that the state transition from state OLD to state NEW of the state element ConfigA would not be executed unless the state of the state element ServiceA is state OFF.

As described above, dependency includes one or more descriptions of "(state element): (set of states)". The dependency of the state element model means that the accompanying state transition would be executed only when a specified state element is one of the states included in the specified set of states. When the specified state element is in one of the states included in the specified set of states, it is defined that the dependency is satisfied.

In a case where a dependency includes a description of "(state element):(set of states)" related to a plurality of state elements, state transition would not be executed unless the dependency is satisfied for all descriptions.

A solution of an automated planning problem on a state element model is a procedure to allow transition of the states of all the state elements included in the state element model to the target state after each of state elements executes a transition. As described above, in order to allow the transition of the states of all state elements to the target state, it would be necessary to generate a procedure appropriately defining an order relationship between transition of a state element and transition of another state element so as to satisfy the dependency, rather than a procedure that enables free transition of the state of each of state elements.

Specific examples of solutions of an automated planning problem on a state element model are shown in FIGS. 23 and 24. FIG. 23 is an explanatory diagram showing an example of a solution of an automated planning problem on the state element model PAR_UPDATE. The serial procedure shown in FIG. 23 corresponds to the serial procedure shown in FIG. 19 described as a solution of the automated planning problem on the state element model PAR_UPDATE shown in FIG. 22.

FIG. 24 is an explanatory diagram showing another example of the solution of the automated planning problem on the state element model PAR_UPDATE. The partial order procedure shown in FIG. 24 corresponds to the partial order procedure shown in FIG. 21 described as a solution to the automated planning problem on the state element model PAR_UPDATE shown in FIG. 22.

As shown in FIGS. 23 and 24, the action to allow transition of the state of a state element E from state a to state b is described as "E: a→b". As described above, since the state of the state element ServiceA is the target state from the beginning, no transition is necessary. However, in order to allow execution of transition of the state OLD→the state NEW of the state element ConfigA, the state of the state element ServiceA needs to be in the state OFF.

Therefore, in order to allow execution of the above transition, the service SA represented by the state element ServiceA is temporarily stopped, and a configuration file of the service SA represented by the state element ConfigA is updated. After the configuration file is updated, the service SA is restarted. That is, three actions need to be executed in the order of action "ServiceA: ON→OFF", action "ConfigA: OLD→NEW", and action "ServiceA: OFF→ON".

In order to ensure the above-described order relationship, arrows are provided in each of the serial procedure shown in FIG. 23 and the partial order procedure shown in FIG. 24. That is, the dependency will surely be satisfied when each of procedures is executed.

Next, transient requirements in the state element model will be described. A transient requirement in a state element model includes two elements, "score assignment to state" and "restriction expression".

First, "score assignment to state" will be described. For each of transient requirements, a score is assigned to each of states of state element models. The assigned scores are all integers.

FIG. 25 is an explanatory diagram showing an example of a score assigned to each of states of the state element model PAR_UPDATE. As shown in FIG. 25, a score "1" is assigned to each of operating states (state ON) of state element ServiceA to state element ServiceD, while a score "0" is assigned to each of stopped states (state OFF) of state element ServiceA to state element ServiceD.

Moreover, a score "0" is assigned to all the states of the state element ConfigA to the state element ConfigD. Hereinafter, the score assigned to the state a will be described as Score (a).

In addition, when the state element E is in the state a at a predetermined time point, the score of the state element E at the predetermined time point is Score (a). Hereinafter, the score of state element E will be described as Score (E). Score (E) changes with the state transition of the state element E.

Furthermore, the sum of the scores of all the state elements included in the state element model M will be referred to as a score of the state element model M. Hereinafter, the score of the state element model M will be described as Score (M). The Score (M) changes with the state transition of the state elements included in the state element model M.

Next, a "restriction expression" which is another element constituting a transient requirement will be described. For example, after assigning a score to each of states of the state element model M, the transient requirement is given in one of the following four patterns.

"1. Score (M) is integer L or more"
"2. Score (M) is integer L or less"
"3. Score (M) is greater than integer L"
"4. Score (M) is less than integer L"

The above content is referred to as a transient requirement restriction expression. Hereinafter, specific example A, specific example B, and specific example C will be described in order to show requirements that can be expressed by the restriction expression of the transient requirement.

Specific Example A.

The above transient requirement given to the automated planning problem shown in FIG. 18 is expressed as "Score (PAR_UPDATE) is 2 or more" using the score shown in FIG. 25. The reason is that the above transient requirement is satisfied only when a service is running on two or more servers.

Specific Example B.

In the automated planning problem shown in FIG. 18, there is an assumption that the performances of respective services provided by four servers are all uniform. However, for example, there might be a situation where there is a difference in performance between individual servers, and the requirement to ensure the performance of the entire service is expressed by "total value of performance" instead of "number of servers running the service".

An example of the above situation is shown in FIG. 26. FIG. 26 is an explanatory diagram showing an example of scores assigned to each of states of the state element model PAR_UPDATE and transient requirements. The score shown in FIG. 26 is assigned to each of states of the state element model shown in FIG. 22.

As shown in FIG. 26, a score "100" is assigned to each of operating states (state ON) of the state element ServiceA and the state element ServiceC. In the example shown in FIG. 26, server A and server C can process 100 requests per second.

As shown in FIG. 26, a score "300" is assigned to each of operating states (state ON) of the state element ServiceB and the state element ServiceD. In the example shown in FIG. 26, server B and server D can process 300 requests per second.

FIG. 26 shows a restriction expression "Score (PAR_UPDATE)≥400". In other words, the requirement to ensure the performance of the entire service is "the total score (number of requests per second that can be processed by the entire system) is 400 or more".

Specific Example C.

FIG. 27 shows an example of a situation where an upper limit is given to available resources. FIG. 27 is an explanatory diagram showing an example of a state element model ConnectingTerminals, the score assigned to each of states, and the transient requirement.

The state element model ConnectingTerminals shown in FIG. 27 includes state elements (terminal 1, terminal 2, . . . , terminal 100) representing each of own terminals and state elements (connection 1, connection 2, . . . , connection 100) representing connection states of each of terminals.

As shown in FIG. 27, the state element indicating the connection state includes a state "connected" and a state "disconnected". In addition, each of current states and each of target states of the state element indicating the connection state are both states "disconnected".

As shown in FIG. 27, the state element representing the terminal includes a state "un-updated" and a state "updated". Each of current states of the state element representing the terminal is the state "un-updated", and each of target states is the state "updated". The state transition of the terminal x is accompanied by the dependency "connection x: connected".

That is, the state element model ConnectingTerminals shown in FIG. 27 can express an automated planning problem that "a plurality of terminals (100) access the server and downloads update data, and thereafter performs update". The maximum number of terminals that can simultaneously connect to the server is 50.

As shown in FIG. 27, a score "1" is assigned to the state "connected" of the state element indicating the connection state. FIG. 27 shows a restriction expression "Score (ConnectingTerminals)≤50".

In other words, the automated planning problem represented by the state element model ConnectingTerminals has a transient requirement that the number of state elements representing a connection state in which the state is the state "connected" need to be always be 50 or less. The transient requirement shown in FIG. 27 is a transient requirement that uses an upper limit value.

CITATION LIST

Patent Literature

PTL 1: US Patent Application Publication No. 2015/0324211

Non Patent Literature

NPL 1: Christian Muise, Sheila A. McIlraith, and J. Christopher Beck, "Optimally Relaxing Partial-Order Plans with MaxSAT," ICAPS' 12.

SUMMARY OF INVENTION

Technical Problem

For automated planning problems with transient requirements, there is provided a technique for deriving a serial procedure that satisfies transient requirements. PTL 1 and Non Patent Literature (NPL) 1 describe a technique of converting a serial procedure into a partial order procedure in consideration of the dependency between state elements.

However, the serial procedure that satisfies the derived transient requirement undergoes partial ordering by the techniques described in PTL 1 or NPL 1, a partial order procedure that does not satisfy the specified transient requirement might be output in some cases.

For example, the serial procedure shown in FIG. 23 is a serial procedure that defines an order relationship so that operation is to be executed in the order of Agent A, Agent B, Agent C, and Agent D. The serial procedure shown in FIG. 23 satisfies the transient requirement "service state need to be in operation with at least two servers".

However, when the technique described in PTL 1 or NPL 1 relaxes the order relationship of the serial procedure shown in FIG. 23 so as to allow all of operations to be executed in parallel for the reason that there is no direct dependency between agents, a partial order procedure as shown in FIG. 28 will be generated.

FIG. 28 is an explanatory diagram showing another example of the solution of the automated planning problem on the state element model PAR_UPDATE. The partial order procedure shown in FIG. 28 corresponds to the partial order procedure shown in FIG. 20 described as a solution to the automated planning problem on the state element model PAR_UPDATE shown in FIG. 22. As described above, the partial order procedure shown in FIG. 28 does not satisfy the above transient requirement.

In order to perform partially ordering on the serial procedure while the transient requirement is satisfied, it would be required, for example, to delete unnecessary order relationships alone while leaving the order relationship for satisfying the transient requirement between the state elements having no dependency relation, as shown in FIG. 24.

Object of Invention

Therefore, an object of the present invention is to provide a partial order procedure planning device, a partial order procedure planning method, and a partial order procedure planning program capable of planning a partial order procedure that satisfies transient requirements and that solves the above-described problems.

Solution to Problem

A partial order procedure planning device according to the present invention includes: a first generation unit which generates a first condition of a removable order relationship under a predetermined restriction among order relationships between operations in a serial procedure in which a plurality of operations, which transit the state of a state element from an initial state to a target state, are arranged in series; a second generation unit which generates a second condition of an order relationship, which is required to satisfy a transient requirement that is required to satisfy the state element while a state among the order relationships is transitioned from the initial state to the target state; and a determination unit which determines, as the order relationship to be deleted from the serial procedure, an order relationship which satisfies the generated first condition, but does not satisfy the generated second condition.

A partial order procedure planning method according to the present invention includes: generating a first condition of a removable order relationship under a predetermined restriction among order relationships between operations in a serial procedure in which a plurality of operations, which transit the state of a state element from an initial state to a target state, are arranged in series; generating a second condition of an order relationship, which is required to satisfy a transient requirement that is required to satisfy the state element while a state among the order relationships is transitioned from the initial state to the target state; and determining, as the order relationship to be deleted from the serial procedure, an order relationship which satisfies the generated first condition, but does not satisfy the generated second condition.

A partial order procedure planning program according to the present invention causes a computer to execute processing including: first generation processing that generates a first condition of a removable order relationship under a predetermined restriction among order relationships between operations in a serial procedure in which a plurality of operations, which transit the state of a state element from an initial state to a target state, are arranged in series; second generation processing that generates a second condition of an order relationship, which is required to satisfy a transient requirement that is required to satisfy the state element while a state among the order relationships is transitioned from the initial state to the target state; and determination processing that determines, as the order relationship to be deleted from the serial procedure, an order relationship which satisfies the generated first condition, but does not satisfy the generated second condition.

Advantageous Effects of Invention

According to the present invention, it is possible to plan a partial order procedure that satisfies transient requirements.

BRIEF DESCRIPTION OF DRAWINGS

FIG. 4 is an explanatory diagram showing an example of transient requirements input to the transient requirement normalization unit 101.

FIG. 7 is an explanatory diagram showing an example of restrictions generated by the technique described in NPL 1.

FIG. 14 is an explanatory diagram showing an example of a flow existence restriction.

FIG. 25 is an explanatory diagram showing an example of a score assigned to each of states of the state element model PAR_UPDATE.

FIG. 26 is an explanatory diagram showing an example of scores assigned to each of states of the state element model PAR_UPDATE and transient requirements.

DESCRIPTION OF EMBODIMENTS

First Exemplary Embodiment

[Description of Configuration]

Figure 1:
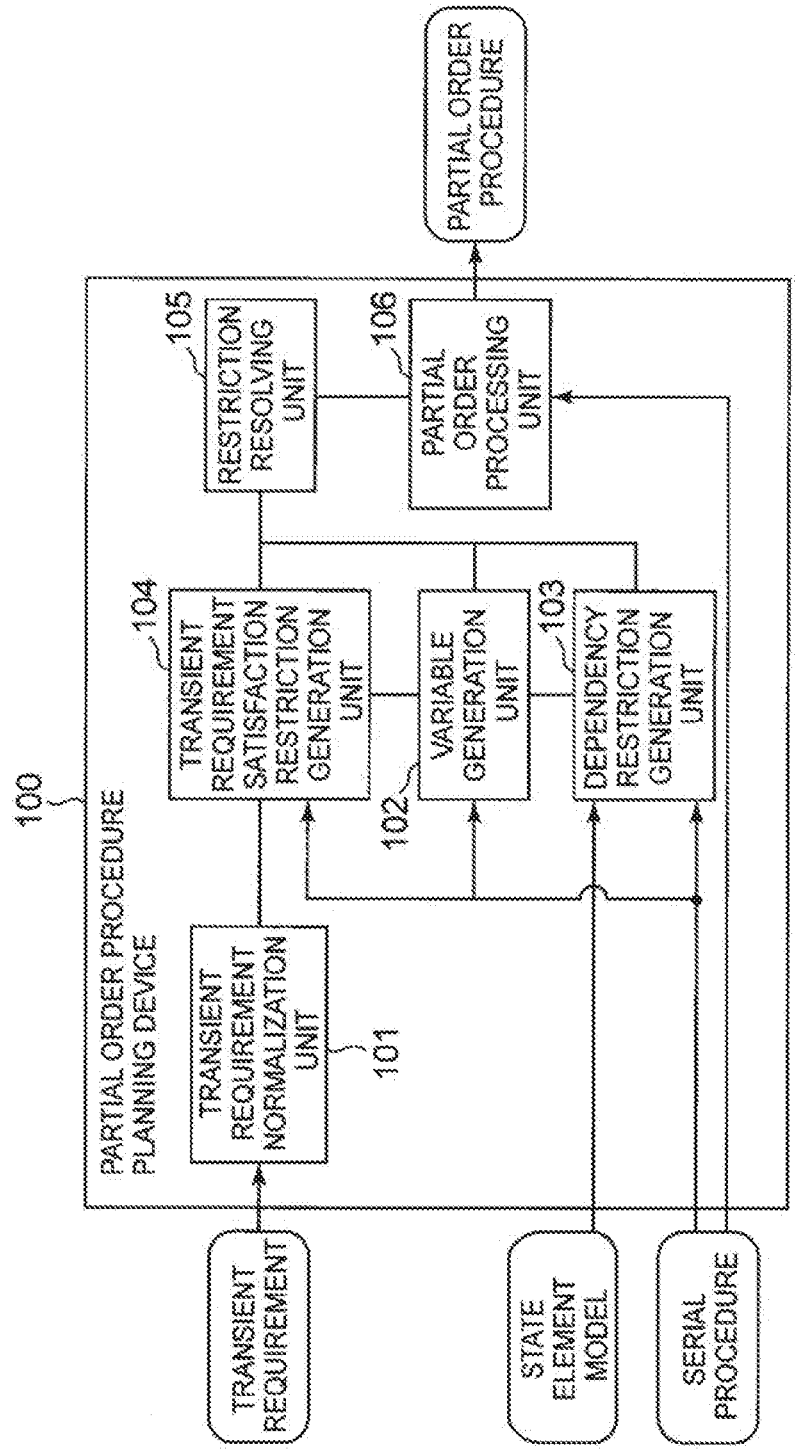
FIG. 1 is a block diagram showing a configuration example of a partial order procedure planning device according to a first exemplary embodiment of the present invention.

Hereinafter, exemplary embodiments of the present invention will be described with reference to the drawings. FIG. 1 is a block diagram showing a configuration example of a partial order procedure planning device according to a first exemplary embodiment of the present invention.

A partial order procedure planning device 100 according to the present exemplary embodiment determines a task execution procedure for achieving an object while an autonomous control system including artificial intelligence satisfies a predetermined restriction. The partial order procedure planning device 100 can derive a partial order procedure that is a solution to an automated planning problem that satisfies a transient requirement and can be efficiently executed for the automated planning problem on a state element model in which the transient requirement is specified.

The partial order procedure planning device 100 shown in FIG. 1 deletes some of the order relationships defined between actions of the serial procedure within a range that meets the restrictions required to be satisfied as a procedure that meets the transient requirement, and thereby generates a partial order procedure. That is, with the use of the partial order procedure planning device 100 of the present exemplary embodiment, it is possible to obtain a partial order procedure that would not violate the transient requirement.

As shown in FIG. 1, the partial order procedure planning device 100 of the present exemplary embodiment includes a transient requirement normalization unit 101, a variable generation unit 102, a dependency restriction generation unit 103, a transient requirement satisfaction restriction generation unit 104, a restriction resolving unit 105 and a partial order processing unit 106.

The transient requirement normalization unit 101 has a function of normalizing transient requirements. Specifically, the transient requirement normalization unit 101 transforms a restriction expression of transient requirement expressed by one of patterns "1. Score (M) is integer L or more", "2. Score (M) is integer L or less", "3. Score (M) is greater than integer L" or "4. Score (M) is less than integer L" into the pattern of "1. Score (M) is integer L or more". Hereinafter, the integer L will be referred to as a "lower limit value" of the transient requirement.

After transforming the pattern, the transient requirement normalization unit 101 transforms the transient requirement so that the scores assigned to the states become all integers of 0 or more. For example, the transient requirement normalization unit 101 converts a score assignment including a negative number into a score assignment in which all scores are integers of 0 or more without changing the meaning of the transient requirement.

A series of transformation operation by the transient requirement normalization unit 101 for the above transient requirement will be referred to as "normalization" of the transient requirement. Even when normalization by the transient requirement normalization unit 101 is performed, the original meaning of the transient requirement would not be changed. For example, any partial order procedure that meets the transient requirement before normalization also meets the transient requirement after normalization. In addition, any partial order procedure that meets the transient requirements after normalization also meets the transient requirements before normalization.

That is, even when the transient requirement after normalization is given as an input from the beginning, the partial order procedure planning device 100 returns the same output as when the transient requirement before normalization was given as an input. The transient requirement normalization unit 101 can convert restriction expressions of all patterns into a restriction expression of pattern 1 without changing the meaning of the transient requirement.

The variable generation unit 102 has a function of assigning a variable that can take 0 or 1 to each of order relationships included in the serial procedure. The variable generation unit 102 inputs a set of all assigned variables to the dependency restriction generation unit 103, the transient requirement satisfaction restriction generation unit 104, and the restriction resolving unit 105.

The dependency restriction generation unit 103 has a function of generating a restriction of dependency that is required to be satisfied for normal execution of all actions included in the serial procedure, as an integer programming restriction expression on the variable given from the variable generation unit 102.

The dependency restriction generation unit 103 inputs the generated integer programming restriction expression to the restriction resolving unit 105. Note that the dependency restriction generation unit 103 may generate an integer programming restriction expression by a technique similar to the technique described in NPL 1.

The transient requirement satisfaction restriction generation unit 104 has a function of generating an order relationship restriction that is required to be satisfied in order to satisfy the transient requirement, as an integer programming restriction expression on a variable given from the variable generation unit 102. The transient requirement satisfaction restriction generation unit 104 inputs the generated integer programming restriction expression to the restriction resolving unit 105.

The restriction resolving unit 105 has a function of assigning a value to a variable so as to satisfy the integer programming restriction expression input from the dependency restriction generation unit 103 and the transient requirement satisfaction restriction generation unit 104. Specifically, the restriction resolving unit 105 assigns 0 or 1 to each of variables input from the variable generation unit 102 so as to satisfy the integer programming restriction expression.

Next, the restriction resolving unit 105 obtains a set of variables to which 1 is assigned the least. The restriction resolving unit 105 inputs the obtained set of variables to the partial order processing unit 106.

The partial order processing unit 106 has a function of generating a partial order procedure by removing a part of the order relationship from the input serial procedure on the basis of value assignment to the set of variables input from the restriction resolving unit 105.

In order to simplify the processing, two virtual actions of "initialization" and "termination" are added to the serial procedure of the present exemplary embodiment. The initialization action is added to the beginning of the serial procedure, and the termination action is added to the end of the serial procedure.

Figure 2:
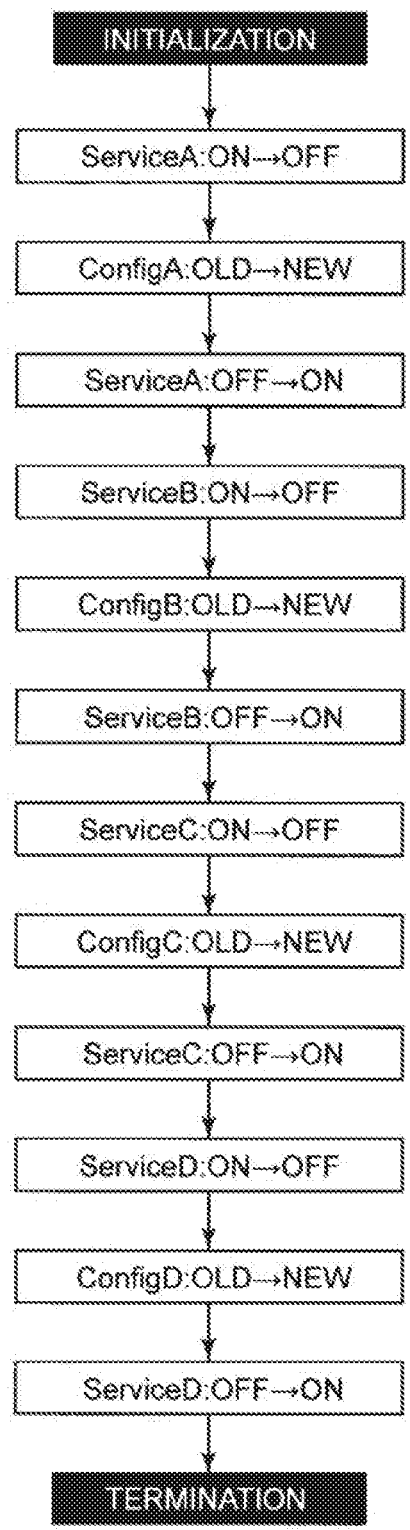
FIG. 2 is an explanatory diagram showing an example of a procedure in which a virtual initialization action and a virtual termination action have been added.
Figure 23:
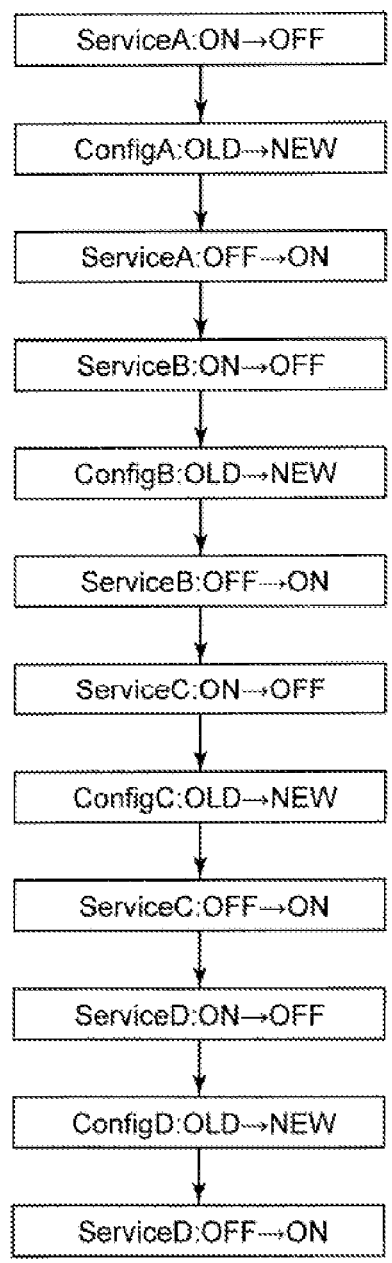
FIG. 23 is an explanatory diagram showing an example of a solution of an automated planning problem on a state element model PAR_UPDATE.
Figure 24:
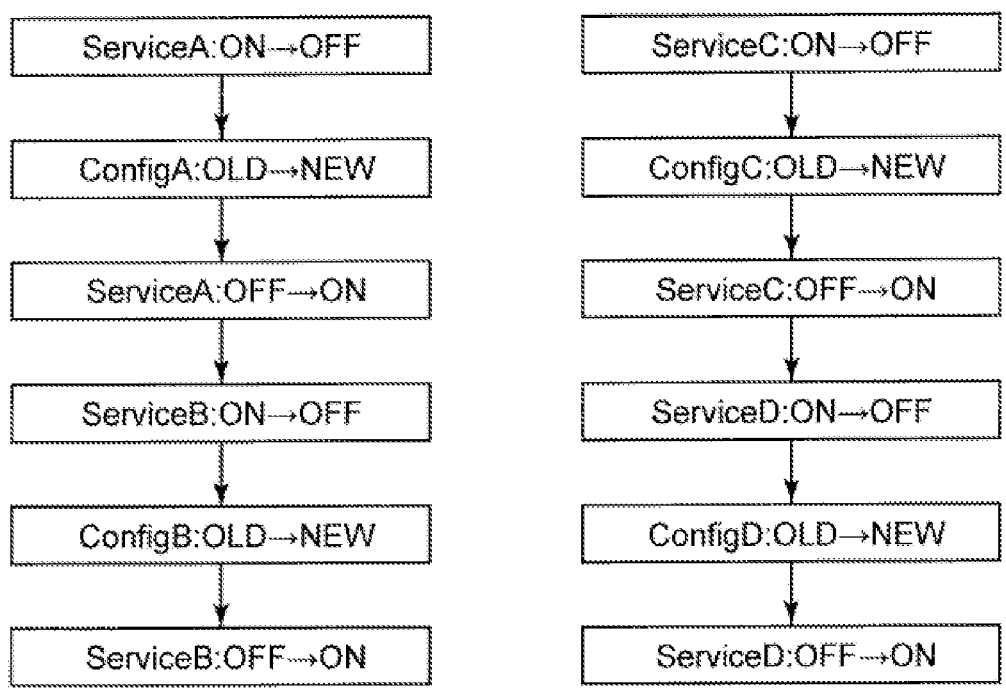
FIG. 24 is an explanatory diagram showing another example of the solution of the automated planning problem on the state element model PAR_UPDATE.
Figure 27:
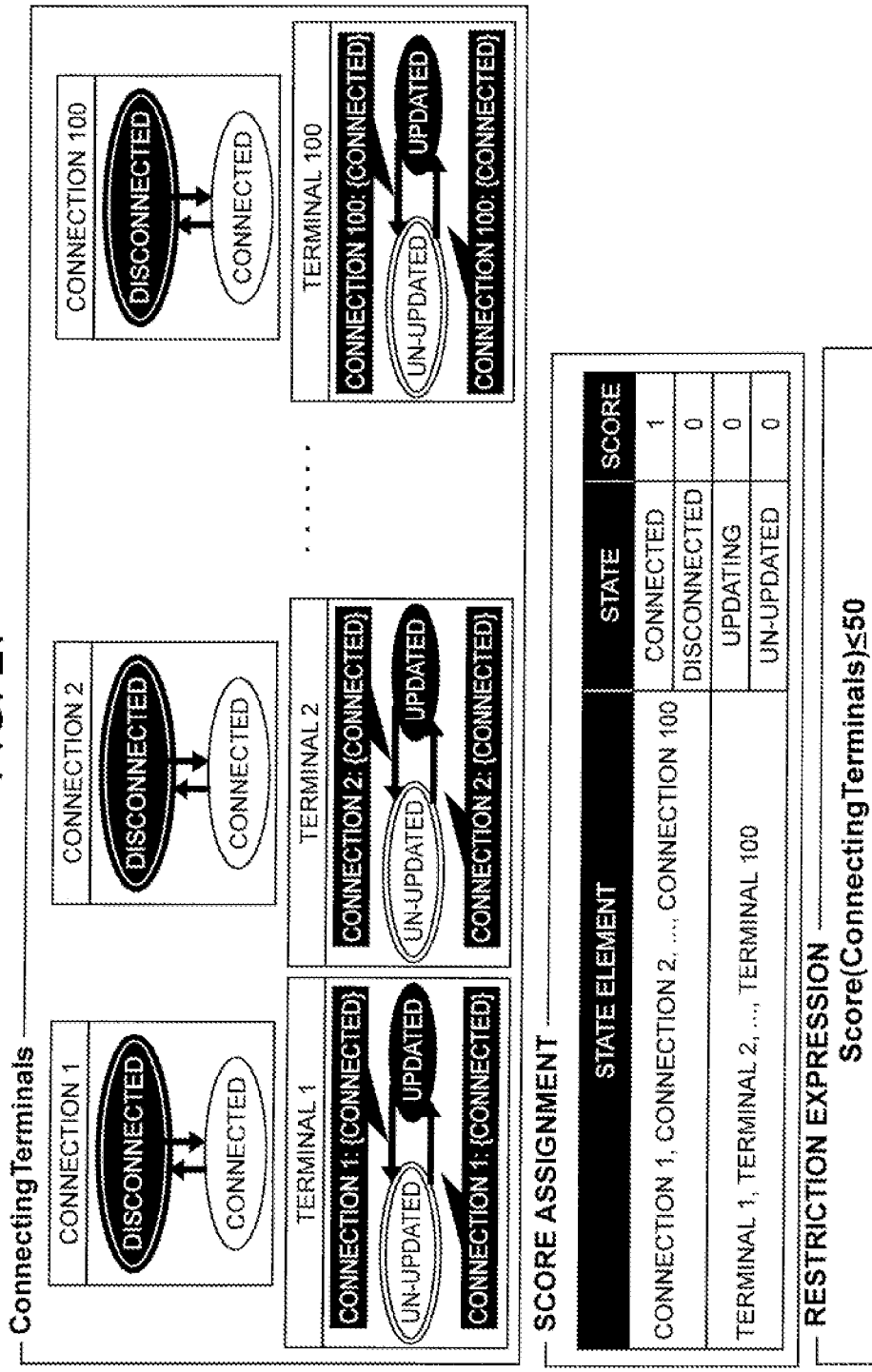
FIG. 27 is an explanatory diagram showing an example of a state element model ConnectingTerminals, a score assigned to each of states, and a transient requirement.
Figure 28:
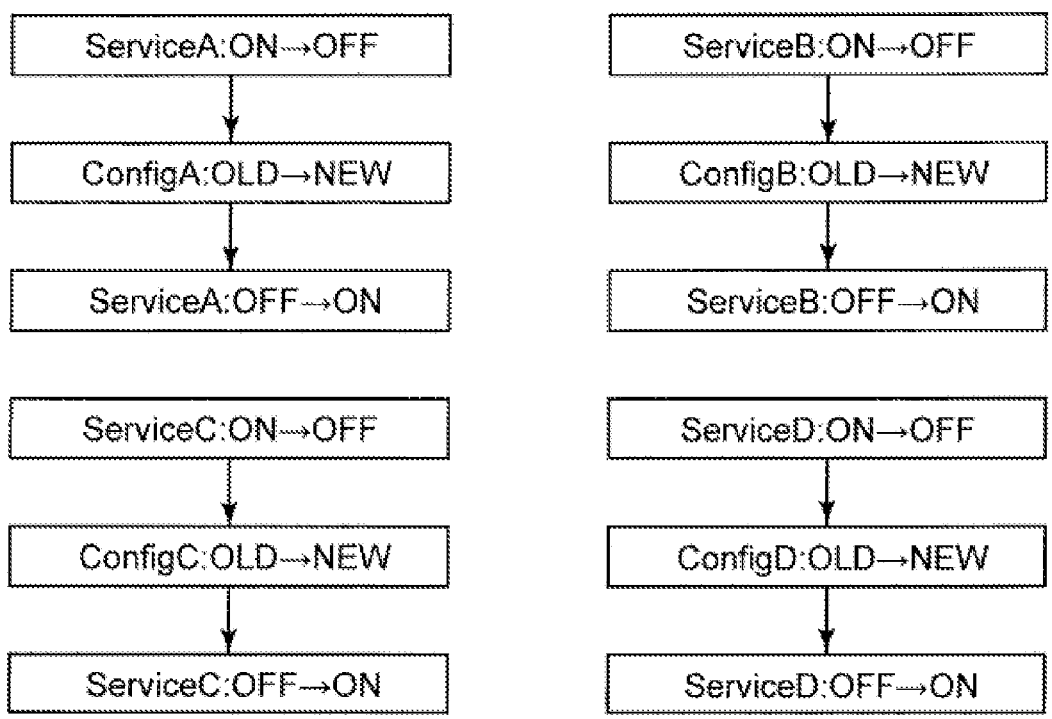
FIG. 28 is an explanatory diagram showing another example of the solution of the automated planning problem on the state element model PAR_UPDATE.

FIG. 2 is an explanatory diagram showing an example of a procedure in which a virtual initialization action and a virtual termination action have been added. The serial procedure shown in FIG. 2 is a procedure in which an initialization action and an termination action are added to the serial procedure that is one of the solutions of the automated planning problem on the state element model PAR_UPDATE shown in FIG. 23.

The initialization action and the termination action are special actions that do not correspond to the state transition belonging to the state element. That is, the initialization action is an action that allows the state of all the state elements to transition to the initial state. In addition, the termination action is an action that can be executed only when the states of all the state elements are the target state. Even when the termination action is executed, the operation ends without performing anything.

The initialization action is required to be executed before any other task even in a procedure in which the input serial procedure undergoes partial ordering. In addition, the termination action is required to be executed after any other task even in a procedure in which the input serial procedure undergoes partial ordering.

The partial order procedure planning device 100 according to the present exemplary embodiment derives a partial order procedure that is the solution of the automated programming problem that satisfies the transient requirement on the basis of a state element model including a plurality of state elements, a transient requirement defined on the state element model, and a serial procedure being a solution of the automated planning problem on the state element model that satisfies the transient requirement.

The partial order procedure planning device 100 derives the partial order procedure by re-defining an order relationship between actions defined in the serial procedure so as to reduce redundant order relationships other than the order relationship required to satisfy the dependency needed for execution of the action and other than the order relationship required to satisfy the transient requirements.

[Description of Operation]

Hereinafter, operation of outputting the partial order procedure of the partial order procedure planning device 100 of the present exemplary embodiment will be described with reference to FIGS. 3 to 14.

Figure 3:
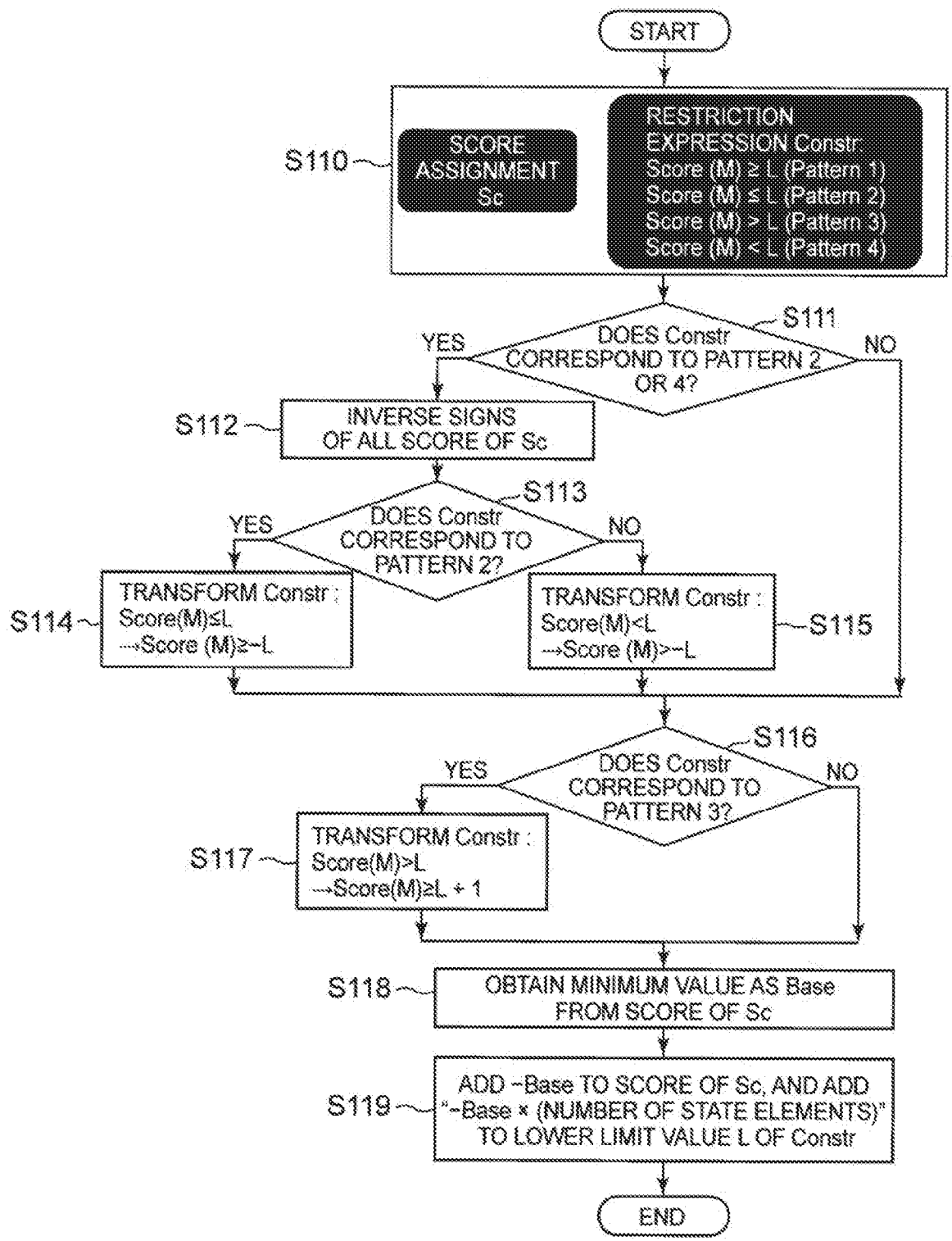
FIG. 3 is a flowchart showing operation of transient requirement normalization processing performed by a transient requirement normalization unit 101.

First, operation of normalizing the transient requirement of the transient requirement normalization unit 101 will be described with reference to FIG. 3. FIG. 3 is a flowchart showing operation of the transient requirement normalization processing performed by the transient requirement normalization unit 101.

First, the transient requirement imposed on the state element model M input to the partial order procedure planning device 100 is input to the transient requirement normalization unit 101 (step S110). The score assignment of the input transient requirement will be described as Sc and the restriction expression will be described as Constr.

Next, the transient requirement normalization unit 101 confirms whether Constr corresponds to one of the restriction expression of pattern 2 that is "Score (M) is the integer L or less" or the restriction expression of pattern 4 that "Score (M) is less than the integer L" (step S111). In a case where Constr does not correspond to the restriction expression of pattern 2 or the restriction expression of pattern 4 (No in step S111), the transient requirement normalization unit 101 performs processing of step S116.

In a case where Constr corresponds to one of the restriction expression of pattern 2 or the restriction expression of pattern 4 (Yes in step S111), the transient requirement normalization unit 101 inverts the sign of all the scores of Sc (step S112).

Next, the transient requirement normalization unit 101 confirms whether Constr corresponds to the restriction expression of pattern 2 (step S113). In a case where Constr corresponds to the restriction expression of pattern 2 (Yes in step S113), the transient requirement normalization unit 101 replaces the content of Constr with "Score (M) is integer –L or more" (step S114).

When Constr corresponds to the restriction expression of pattern 4 rather than the restriction expression of pattern 2 (No in step S113), the transient requirement normalization unit 101 replaces the content of Constr with "Score (M) is greater than integer –L" (step S115).

At the stage where the processing up to step S115 is completed, Constr corresponds to one of the restriction expression of pattern 1 that is "Score (M) is integer L or more" or the restriction expression of pattern 3 that is "Score (M) is greater than integer L".

Next, the transient requirement normalization unit 101 confirms whether Constr corresponds to the restriction expression of pattern 3 that is "Score (M) is greater than integer L" (step S116). In a case where Constr does not correspond to the restriction expression of pattern 3 (No in step S116), the transient requirement normalization unit 101 performs the processing of step S118.

In a case where Constr corresponds to the restriction expression of pattern 3 (Yes in step S116), the transient requirement normalization unit 101 replaces the content of Constr with "Score (M) is integer (L+1) or more" (step S117).

At the stage where the processing up to step S117 is completed, Constr corresponds to the restriction expression of pattern 1 that is "Score (M) is integer L or more". As described above, in the following processing, integer L will be referred to as a "lower limit value" of the transient requirement.

Next, the transient requirement normalization unit 101 acquires a minimum value of the score of Sc, as Base (step S118).

Next, the transient requirement normalization unit 101 adds the value of –Base to all the scores assigned to the states. Furthermore, the transient requirement normalization unit 101 adds "–Base×(number of state elements)" to the lower limit value L of Constr (step S119). After the addition, the transient requirement normalization unit 101 ends the transient requirement normalization processing.

At the stage where the transient requirement normalization processing is completed, the transient requirement scores Sc are all normalized to a value of 0 or more. Furthermore, the restriction expression Constr is normalized to the restriction expression of the pattern 1 "Score (M) is integer L or more".

Hereinafter, the transient requirement normalization processing performed by the transient requirement normalization unit 101 will be described using a specific example. In the present example, the input state element model to which a transient requirement Re is imposed is Me. The state element model Me includes a state element A and a state element B having the same format. Both the state element A and the state element B have three states, a state a, a state b, and a state c.

FIG. 4 is an explanatory diagram showing an example of transient requirements input to the transient requirement normalization unit 101. FIG. 4 shows the transient requirement Re input to the transient requirement normalization unit 101.

As shown in FIG. 4, each of the scores "0", "1", and "–1" are assigned to the state a, the state b, and the state c of the state element A and the state element B. Hereinafter, the score assignment shown in FIG. 4 will be described as {a: 0, b: 1, c: –1}. The restriction expression is "Score (Me) is less than 2".

Since the above restriction formula corresponds to the restriction expression of pattern 4 that is "Score (M) is less than integer L" (Yes in step S111), the transient requirement normalization unit 101 inverts the sign of all scores (step S112). After being inverted, the score assignment is written as {a: 0, b: –1, c: 1}.

Since the above restriction expression corresponds to the restriction expression of pattern 4 (No in step S113), the transient requirement normalization unit 101 transforms the content of the restriction expression to "Score (Me) is greater than –2" (step S115).

Since the restriction expression corresponds to the restriction expression of pattern 3 that is "Score (M) is greater than integer L" at the stage where the processing up to step S115 is completed (Yes in step S116), the transient requirement normalization unit 101 transforms the content of the restriction expression to "Score (Me) is –1 or more" (step S117).

Next, the transient requirement normalization unit 101 acquires "–1", which is the smallest value of the scores, as Base (step S118). Next, the transient requirement normalization unit 101 adds "1" which is –Base to all scores. The transient requirement normalization unit 101 adds "(1×2=) 2" to "–1" which is the lower limit value of the transient requirement (step S119).

Finally, the transient requirement score assignment in the present specific example is normalized to {a: 1, b: 0, c: 2}.

In addition, the restriction expression of the transient requirement in the present specific example is normalized to "Score (Me) is 1 or more".

Next, variable generation processing performed by the variable generation unit 102 will be described. The variable generation unit 102 assigns variables to all the order relationships between actions included in the input serial procedure. The variable generation unit 102 assigns one variable to one order relationship.

Figure 5:
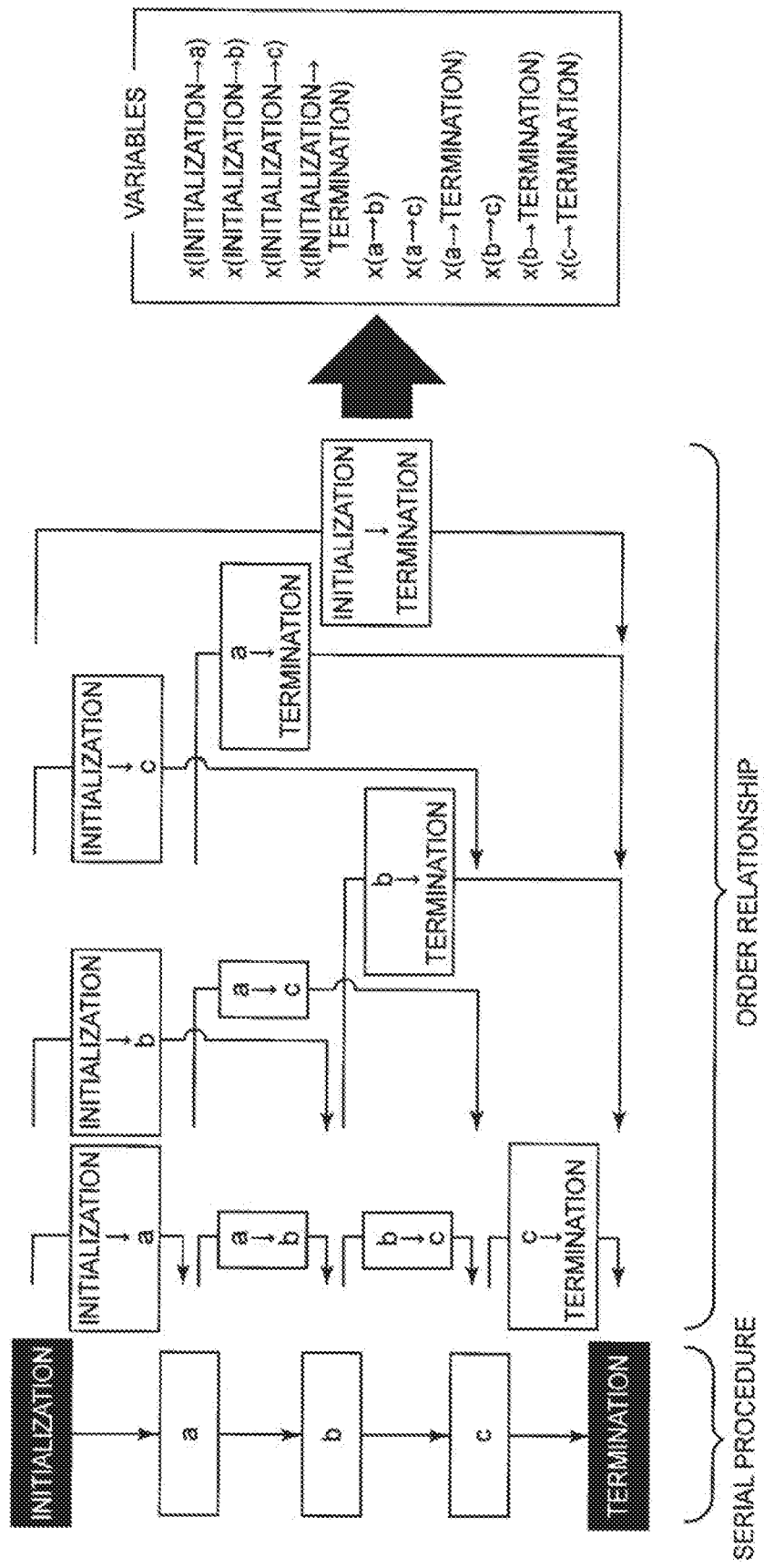
FIG. 5 is an explanatory diagram showing an example of variable generation processing performed by a variable generation unit 102.

FIG. 5 is an explanatory diagram showing an example of variable generation processing performed by the variable generation unit 102. The procedure shown in FIG. 5 is a serial procedure formed of five actions of "initialization", "a", "b", "c", and "termination".

Similarly to the order relationship shown in FIG. 5, the procedure shown in FIG. 5 which is a serial procedure includes a total of ten order relationships, namely, (initialization→a), (initialization→b), (initialization→c), (initialization→termination), (a→b), (a→c), (a→termination), (b c), (b→termination), and (c→termination). In general, a serial procedure formed of n actions includes $\{(1/2) \times n \times (n-1)\}$ order relationships.

The variable generation unit 102 assigns a variable to each of order relationships. That is, the variable generation unit 102 generates a total of ten variables: x (initialization→a), x (initialization→b), x (initialization→c), x (initialization→termination), x (a→b), x (a→c), x (a→termination), x (b c), x (b→termination), x (c→termination), from the procedure shown in FIG. 5.

Hereinafter, before describing each of operations of the dependency restriction generation unit 103 and the transient requirement satisfaction restriction generation unit 104, which are components for imposing restrictions on the generated variable, explanation of the meaning of the variable generated by the variable generation unit 102 is considered to be necessary. Therefore, operation of the partial order processing unit 106 will be described first.

The partial order processing unit 106 receives a value assigned to the variable generated by the variable generation unit 102 from the restriction resolving unit 105. The partial order processing unit 106 transforms the serial procedure into a partial order procedure on the basis of the received value.

The restriction resolving unit 105 assigns "0" or "1" to each of variables x (a b). Assigning, by the restriction resolving unit 105, "0" to the variable x (a b) corresponds to giving the partial order processing unit 106 information that "the order relationship (a→b) is an unnecessary order relationship and may be removed".

In addition, assigning, by the restriction resolving unit 105, "1" to the variable x (a→b) corresponds to giving the partial order processing unit 106 information that "the order relationship (a→b) is a necessary order relationship and must not be removed".

The partial order processing unit 106 basically follows the information given from the restriction resolving unit 105 as it is. That is, the partial order processing unit 106 removes the order relationship assigned with "0" from the procedure and leaves the order relationship assigned with "1" in the procedure. That is, one value assigned to a variable has a direct correspondence to one component of the partial order procedure.

Figure 6:
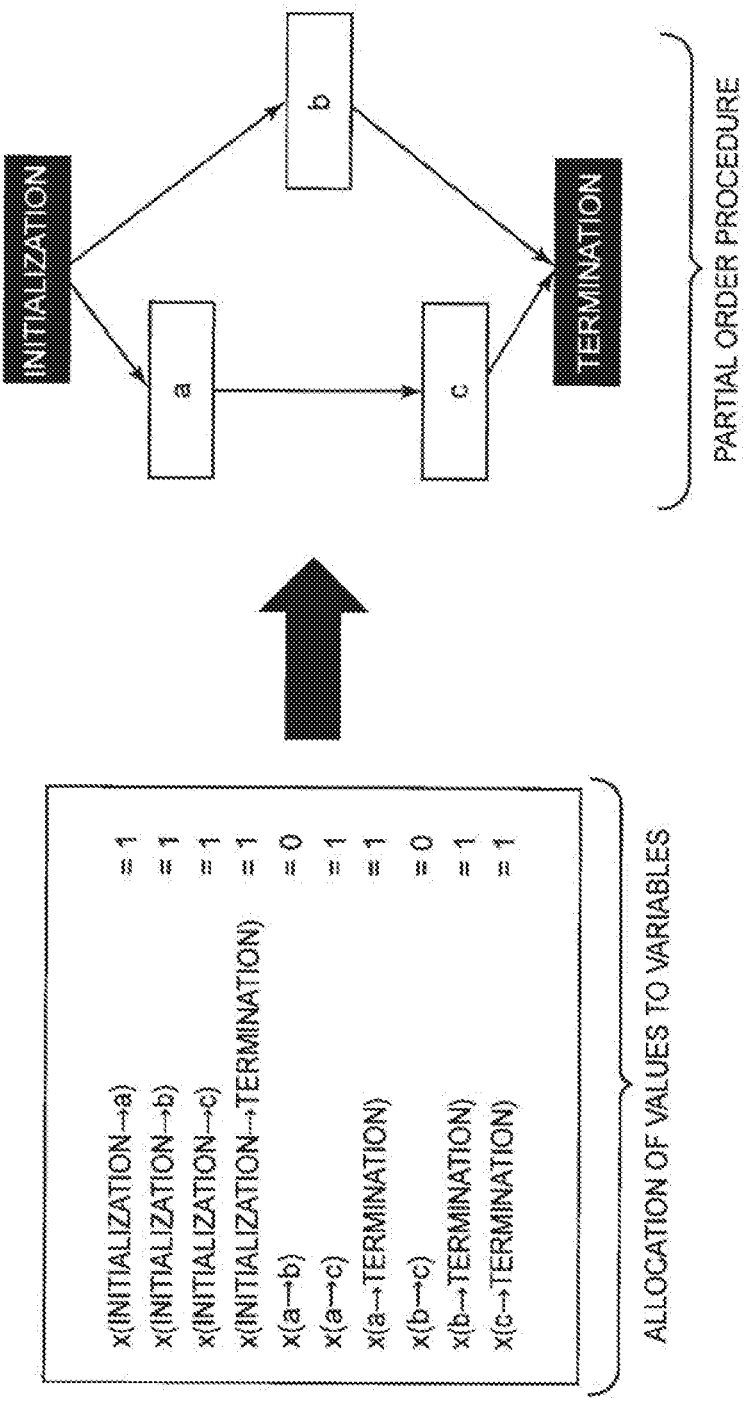
FIG. 6 is an explanatory diagram showing an example of partial order processing performed by a partial order processing unit 106.

FIG. 6 is an explanatory diagram showing an example of partial order processing performed by the partial order processing unit 106. In the partial order processing shown in FIG. 6, the partial order processing unit 106 performs partial ordering on the serial procedure shown in FIG. 5 on the basis of assignment of values to variables.

As shown in FIG. 6, "0" is assigned to two variables x (a→b) and x (b→c). Moreover, "1" is assigned to eight variables, namely, x (initialization→a), x (initialization→b), x (initialization→c), x (initialization→termination), x (a→c), x (a→termination), x (b→termination), and x (c→termination).

When the partial order processing unit 106 performs partial ordering on the basis of the above values, a partial order procedure as shown in FIG. 6 is generated. That is, an order relationship is defined only between "a" and "c" between actions other than "initialization" and "termination", and all other order relationships have been removed.

Next, dependency restriction generation processing performed by the dependency restriction generation unit 103 will be described. In the dependency restriction generation processing, a restriction Cd is generated, which imposed on a variable input from the variable generation unit 102. The restriction Cd has a property that "a correct partial order procedure is obtained by performing partial ordering in accordance with all assignments that satisfy the restriction Cd". Note that the dependency restriction generation unit 103 generates the restriction Cd by a technique similar to the technique described in NPL 1, for example.

The "correct partial order procedure" corresponds to the solution of the automated planning problem on the state element model when the transient requirement is not considered. That is, the "correct partial order procedure" is a partial order procedure that ensures satisfaction of all dependencies at the time of execution of procedure for all actions.

Hereinafter, the technique described in NPL 1 will be briefly described. The technique described in NPL 1 uses a method of describing requirements for obtaining a "correct partial order procedure" as a SAT restriction, that is, as a logical restriction expression on a "Boolean variable" that takes either a value of True or False. FIG. 7 shows a list of restrictions.

FIG. 7 is an explanatory diagram showing an example of restrictions generated by the technique described in NPL 1. As shown in FIG. 7, two types of restrictions are generated. The first restriction is a restriction corresponding to a transitive law, which is a property as an order relationship. Transitive law is, for example, a property of an order relationship that if "b is executed after a" and "c is executed after b", then, "c is executed after a".

As in the first restriction shown in FIG. 7, when a Boolean variable corresponding to the order relationship (a→b) is described as β (a b), the transitive law related to the actions a, b, and c would be described as "$(\beta(a \rightarrow b) \wedge \beta(b \rightarrow c)) \Rightarrow \beta(a \rightarrow c)$".

The second restriction is a restriction that describes a condition that all dependencies are satisfied. In order to express that "all dependencies are satisfied", the technique described in NPL 1 uses a concept that an action "supports" the dependency of another action.

When the above concept is used, it is considered that the dependency of "a state element E on a state s" is supported by the action that has allowed the state of the state element E to transition to the state s. On the basis of the above concept, the technique described in NPL 1 uses a variable "action b supports the dependency of action a on the state s" to express restrictions related to dependencies, separately from β(a→b).

For example, in the technique described in NPL 1, "the action a is supported by the action b" expresses the property that "the action a is executed immediately after the action b"

and the property that "all dependencies need to be supported by some action" in a restriction. In other words, the technique described in NPL 1 expresses a satisfaction condition of the dependency as an SAT restriction as the second restriction shown in FIG. 7.

Figure 8:
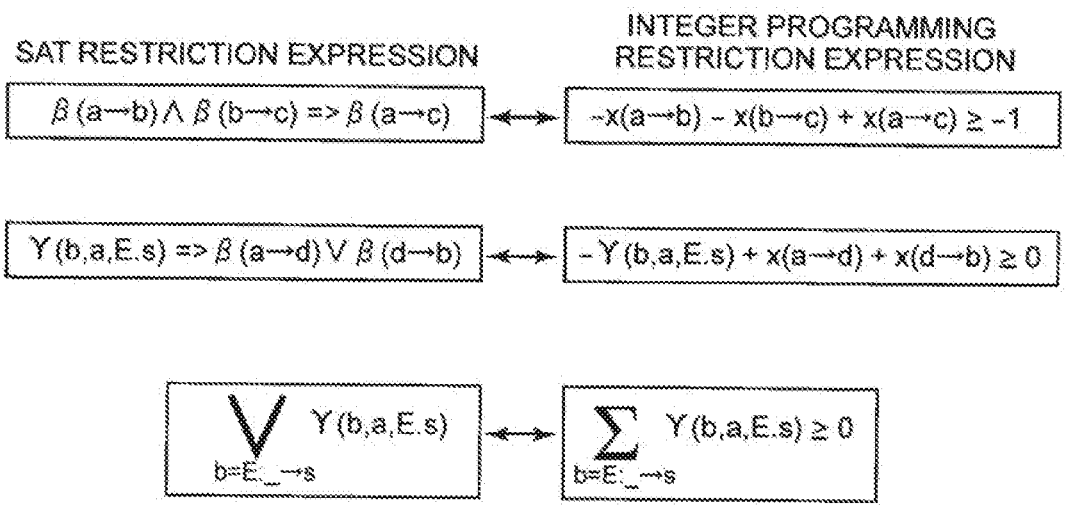
FIG. 8 is an explanatory diagram showing an example of a correspondence between a SAT restriction expression and an integer programming restriction expression.

The dependency restriction generation unit 103 according to the present exemplary embodiment generates the SAT restriction generated by the above technique as an integer programming restriction expression in the dependency restriction generation processing. FIG. 8 shows the correspondence between the two restriction expressions. FIG. 8 is an explanatory diagram showing an example of a correspondence between a SAT restriction expression and an integer programming restriction expression.

The SAT restriction expression shown in FIG. 8 is the restriction shown in FIG. 7. The integer programming restriction expression shown in FIG. 8 is an integer programming restriction expression equivalent to the restriction shown in FIG. 7 generated by the dependency restriction generation unit 103. As shown in FIG. 8, the dependency restriction generation unit 103 associates β True with x "1" and False with x "0" and thereby converts the SAT restriction expression into the integer programming restriction expression.

Figure 9:
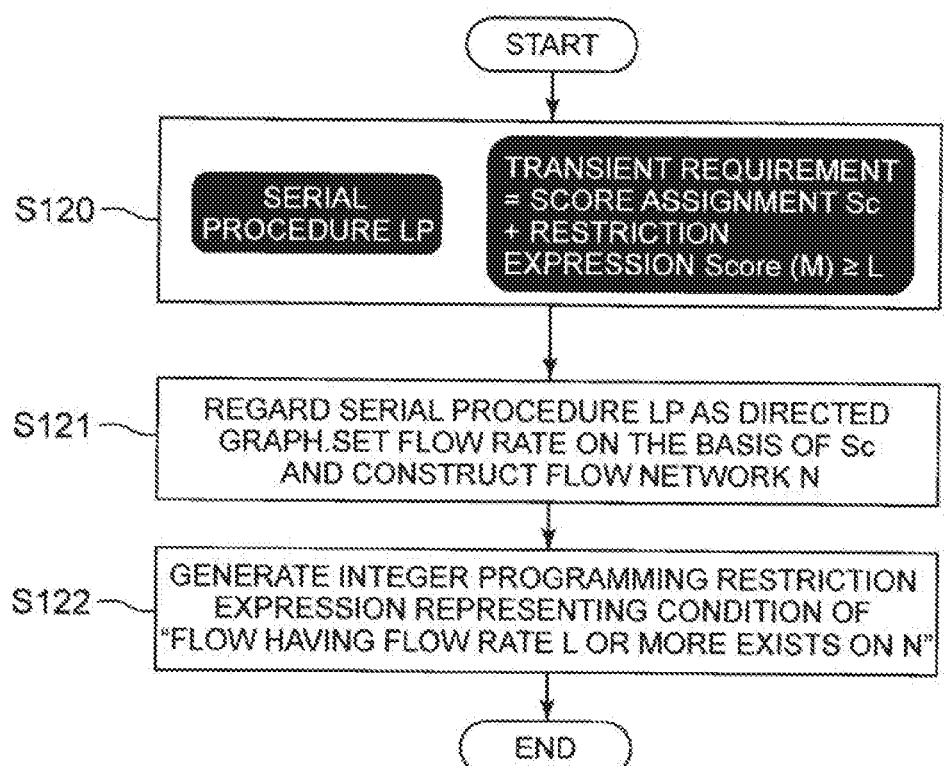
FIG. 9 is a flowchart showing operation of transient requirement satisfaction restriction generation processing performed by a transient requirement satisfaction restriction generation unit 104.

Next, operation of generating the transient requirement satisfaction restriction by the transient requirement satisfaction restriction generation unit 104 will be described with reference to FIG. 9. FIG. 9 is a flowchart showing operation of the transient requirement satisfaction restriction generation processing performed by the transient requirement satisfaction restriction generation unit 104.

First, the transient requirement satisfaction restriction generation unit 104 receives a serial procedure and a transient requirement as inputs (step S120).

Next, the transient requirement satisfaction restriction generation unit 104 regards the input serial procedure as a directed graph in which each of actions is a node and a part of the order relationship is an edge. Next, the transient requirement satisfaction restriction generation unit 104 constructs a flow network on the directed graph on the basis of the score assignment of the input transient requirement (step S121).

The flow network represents a network in which a value of "capacity" is defined at each of edges of the directed graph. A flow network represents a modeled situation where some fluid is passing along an edge of a directed graph.

The capacity corresponds to the upper limit value of the amount of fluid passing along the edge (hereinafter referred to as a "flow rate"). The "flow" of the fluid passing along a flow network from node A to node B will be referred to as a "flow" of the flow network. Node A will be referred to as a "start point" of the flow, and node B will be referred to as an "end point" of the flow. The amount of fluid passing into the end point will be referred to as "flow rate of the flow".

In all the nodes other than the start point and end point in the flow, the "total amount of fluid passing in along the edge (=inflow amount)" and the "total amount of fluid passing out along the edge (=outflow amount)" need to match. Although the inflow amount is zero at the starting point, there is no upper limit to the outflow amount. Moreover, although the outflow amount is 0 at the end point, there is no upper limit to the inflow amount.

Hereinafter, a method by which the transient requirement satisfaction restriction generation unit 104 interprets the serial procedure as a directed graph will be described. The serial procedure is originally regarded as a directed graph by defining each of actions as a node and all order relationships as edges.

The transient requirement satisfaction restriction generation unit 104 according to the present exemplary embodiment regards only the order relationship corresponding to one of the following four patterns among the order relationships, as an edge.

(1) "Order relationship between initialization action and action emerging first among the actions of each of state elements"

(2) "Order relationship (a→b) between action a and action b on state element E, in which action b is an action performed immediately after action a on state element E"

(3) "Order relationship between two actions on different state elements"

(4) "Order relationship between the last action among actions of each of state elements, and the termination action"

Furthermore, the transient requirement satisfaction restriction generation unit 104 directly uses the direction of each of order relationships of (1), (2), and (4), as the edge direction. The transient requirement satisfaction restriction generation unit 104 uses the direction obtained by inverting the direction of the order relationship in (3), as the edge direction.

Figure 10:
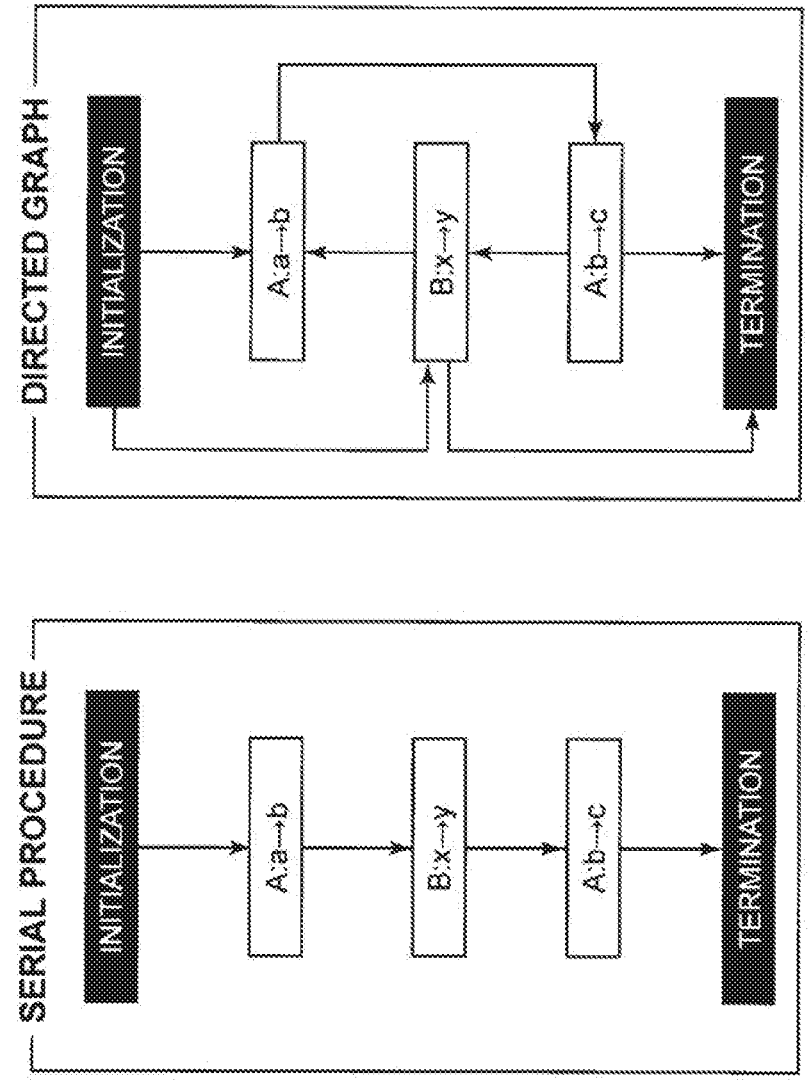
FIG. 10 is an explanatory diagram showing an example of a serial procedure and a directed graph corresponding to the serial procedure.

Hereinafter, a specific example in which the transient requirement satisfaction restriction generation unit 104 interprets the serial procedure as a directed graph will be described with reference to FIG. 10. FIG. 10 is an explanatory diagram showing an example of a serial procedure and a directed graph corresponding to the serial procedure.

The directed graph shown in FIG. 10 includes five nodes: "initialization", "A: a→b", "B: x→y", "A: b→c", and "termination". In addition, the directed graph shown in FIG. 10 includes a total of seven edges between the nodes.

The edge ("initialization"→"A: a→b") and the edge ("initialization"→"B: x→y") shown in FIG. 10 correspond to the pattern (1) described above. The edge ("A: a→b"→"A: b→c") shown in FIG. 10 corresponds to the pattern (2) described above.

The edge ("B: x→y"→"A: a→b") and the edge ("A: b→c"→"B: x→y") shown in FIG. 10 correspond to the pattern (3) described above. The edge ("A: b→c"→"termination") and the edge ("B: x y"→"termination") shown in FIG. 10 correspond to the pattern (4) described above. As described above, the direction of the edge corresponding to the above-described pattern (3) in the directed graph is opposite to the direction of the arrow in the serial procedure.

Next, the transient requirement satisfaction restriction generation unit 104 classifies the arrows of the serial procedure converted into the directed graph into "Across type: edge of pattern (3)" and "Same type: edge of patterns (1), (2), and (4)". After classification into each of types, the transient requirement satisfaction restriction generation unit 104 sets capacity for the edge on the basis of the score assignment.

The transient requirement satisfaction restriction generation unit 104 sets a sufficiently large value being the lower limit value of the transient requirement or more, as a capacity in an Across type edge (hereinafter referred to as an Across edge). In addition, the transient requirement satisfaction restriction generation unit 104 sets the "score of the transition destination state of action a" as a capacity in a Same type edge (hereinafter referred to as a Same edge) having order relationship (a→b).

Note that the transient requirement satisfaction restriction generation unit 104 sets "the score of the transition source state of action b" as the capacity in the edge corresponding to the pattern (1) having order relationship (a→b).

Figure 11:
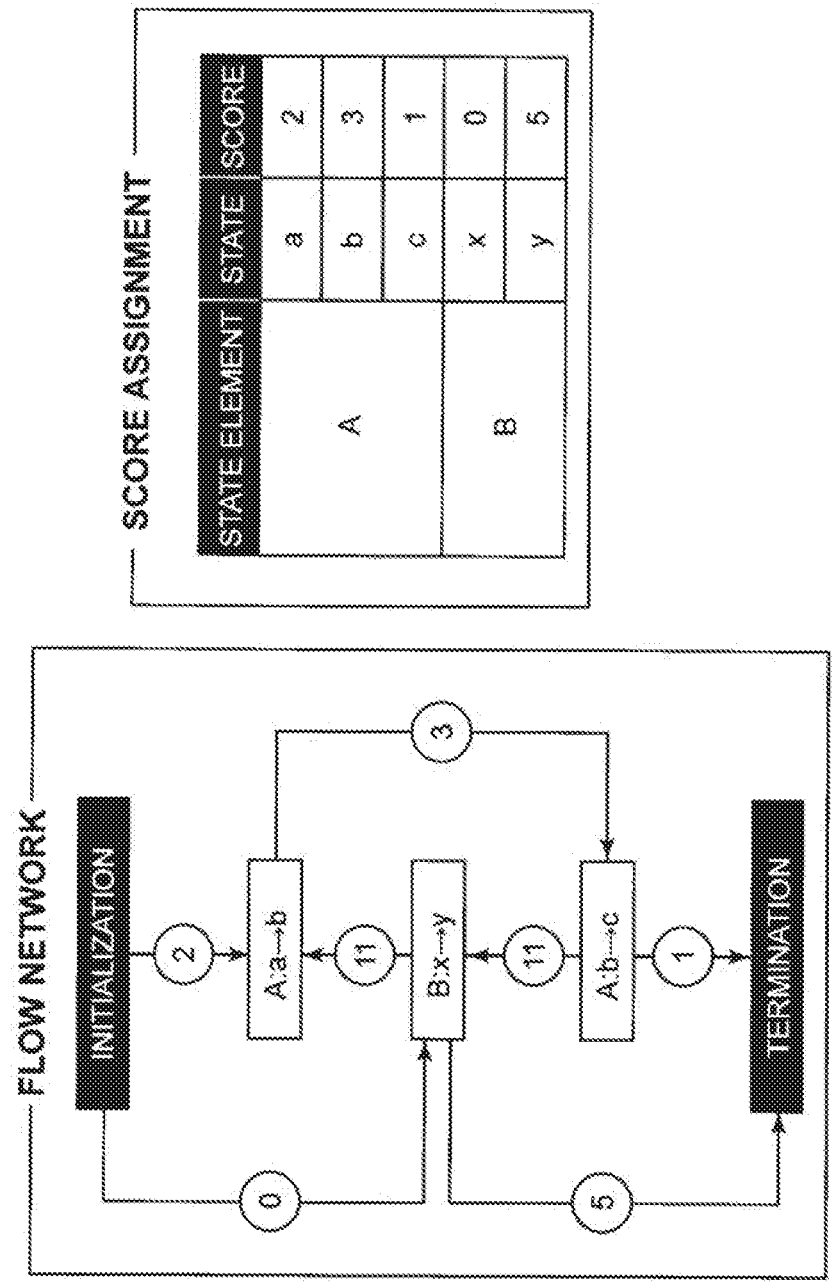
FIG. 11 is an explanatory diagram showing an example of score assignment set in a directed graph and a flow network to be constructed.

Hereinafter, a specific example in which the transient requirement satisfaction restriction generation unit 104 sets the capacity in the edge will be described with reference to FIG. 11. FIG. 11 is an explanatory diagram showing an example of score assignment set in a directed graph and a flow network to be constructed.

The flow network shown in FIG. 11 is a flow network constructed by setting the capacity in the directed graph shown in FIG. 10 by the transient requirement satisfaction restriction generation unit 104 on the basis of the score assignment shown in FIG. 11. The numerical value inside the circle accompanying each of edges shown in FIG. 11 is the capacity set in each of the edges.

Note that the capacity set in the Across edge may be any value as long as it is at least sufficiently greater than the lower limit value of the restriction expression for transient requirements. In the example shown in FIG. 11, "11", which is the sum of scores of all states, is set.

When a flow with a flow rate being the lower limit value of the transient requirement or more passes between the initialization action and the termination action on the converted flow network, all of the partial order procedures including the edge having at least a small amount of flow satisfy the transient requirement. Hereinafter, the reason why the above partial order procedure satisfies the transient requirement will be described.

On the Same edge connecting action π(=(E1: a→b)) and action σ(=(E1: b→c)), the state of state element E1 remains state b in the duration from execution of action π to execution of action σ.

Therefore, the above-described Same edge contributes to the total score by Score (b). That is, the Same edge corresponds to "a period during which the total score is maintained at a predetermined value or higher" in the flow network.

The Across edge connecting the action π(=(E1: a→b)) and the action σ(=(E2: c→d)) means that the action a is executed before the action π.

Figure 12:
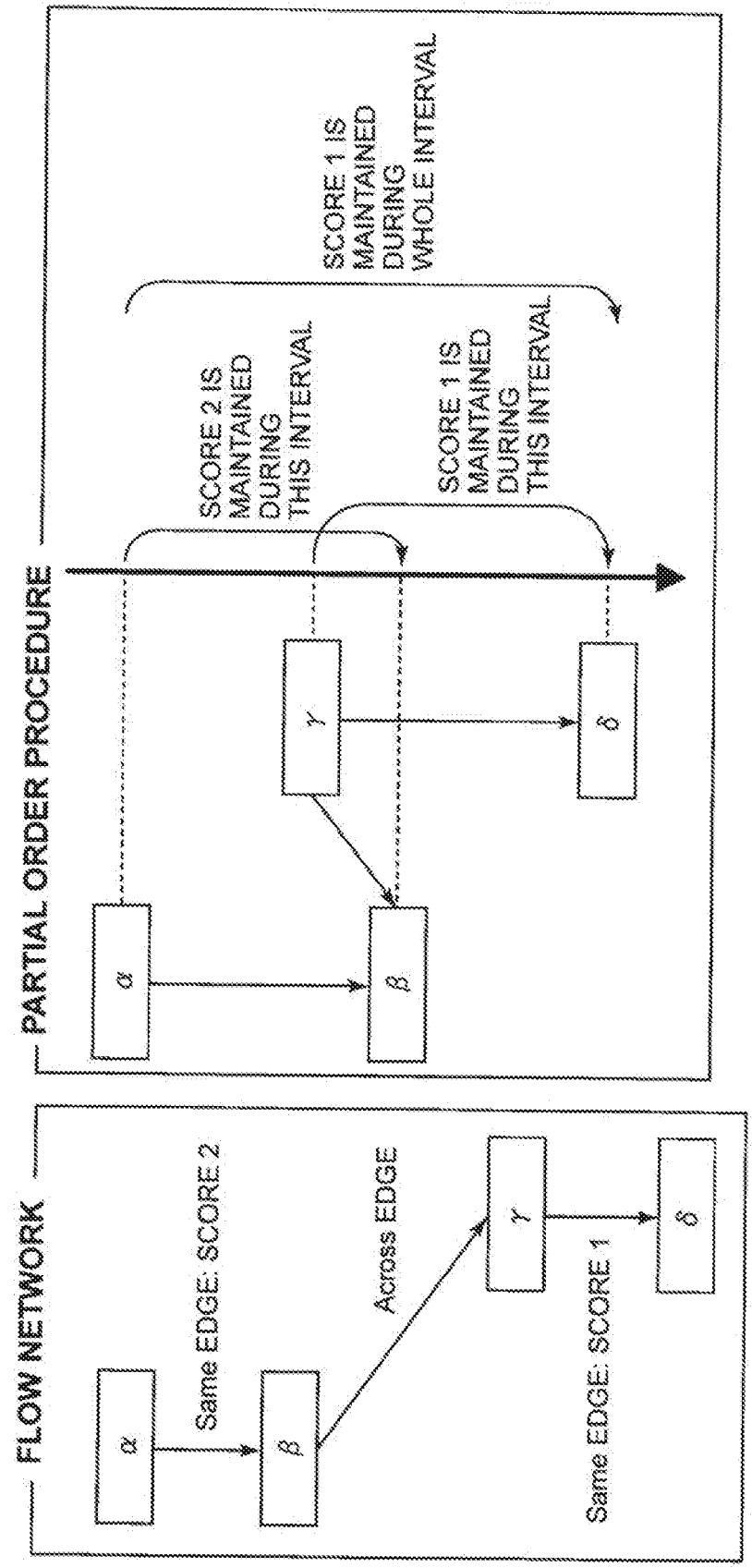
FIG. 12 is an explanatory diagram showing an example of a flow network and a partial order procedure.

FIG. 12 is an explanatory diagram showing an example of a flow network and a partial order procedure. The flow network shown in FIG. 12 includes four actions: action α, action β, action γ, and action δ. The flow network shown in FIG. 12 includes a Same edge (a→β) in which the score "1" is maintained, a Same edge (γ→δ) in which the score "2" is maintained, and an Across edge (β→γ).

The partial order procedure shown in FIG. 12 corresponds to the flow network shown in FIG. 12. The partial order procedure shown in FIG. 12 is a procedure generated by linking four actions with an order relationship.

The Same edge (a→β) of the flow network shown in FIG. 12 ensures that the score "1" is maintained until the action β is executed after the action a is executed in the partial order procedure. In addition, the Same edge (γ→δ) of the flow network ensures that the score "2" is maintained until the action δ is executed after the action γ is executed in the partial order procedure.

Furthermore, the order relationship (γ→β) is defined in the partial order procedure by the Across edge (β→γ) of the flow network shown in FIG. 12, so as to ensure that the score "1" is maintained until the action 6 is executed after the action α is executed.

As described above, the "period during which a predetermined score is maintained" is extended by linking the Same edge and the Across edge.

That is, setting up the flow of flow rate F from the initialization action to the termination action by using an edge corresponds to extension of the "period during which score F is maintained" by linking the Same edge and the Across edge from immediately after execution of the initialization action to the immediately before the termination action.

Maintaining the score "F" from immediately after execution of the initialization action to immediately before execution of the termination action means maintaining the total score of the entire procedure at "F". In other words, a flow having a flow rate being the lower limit value of a given transient requirement or more, ensures satisfaction of the transient requirement.

Figure 13:
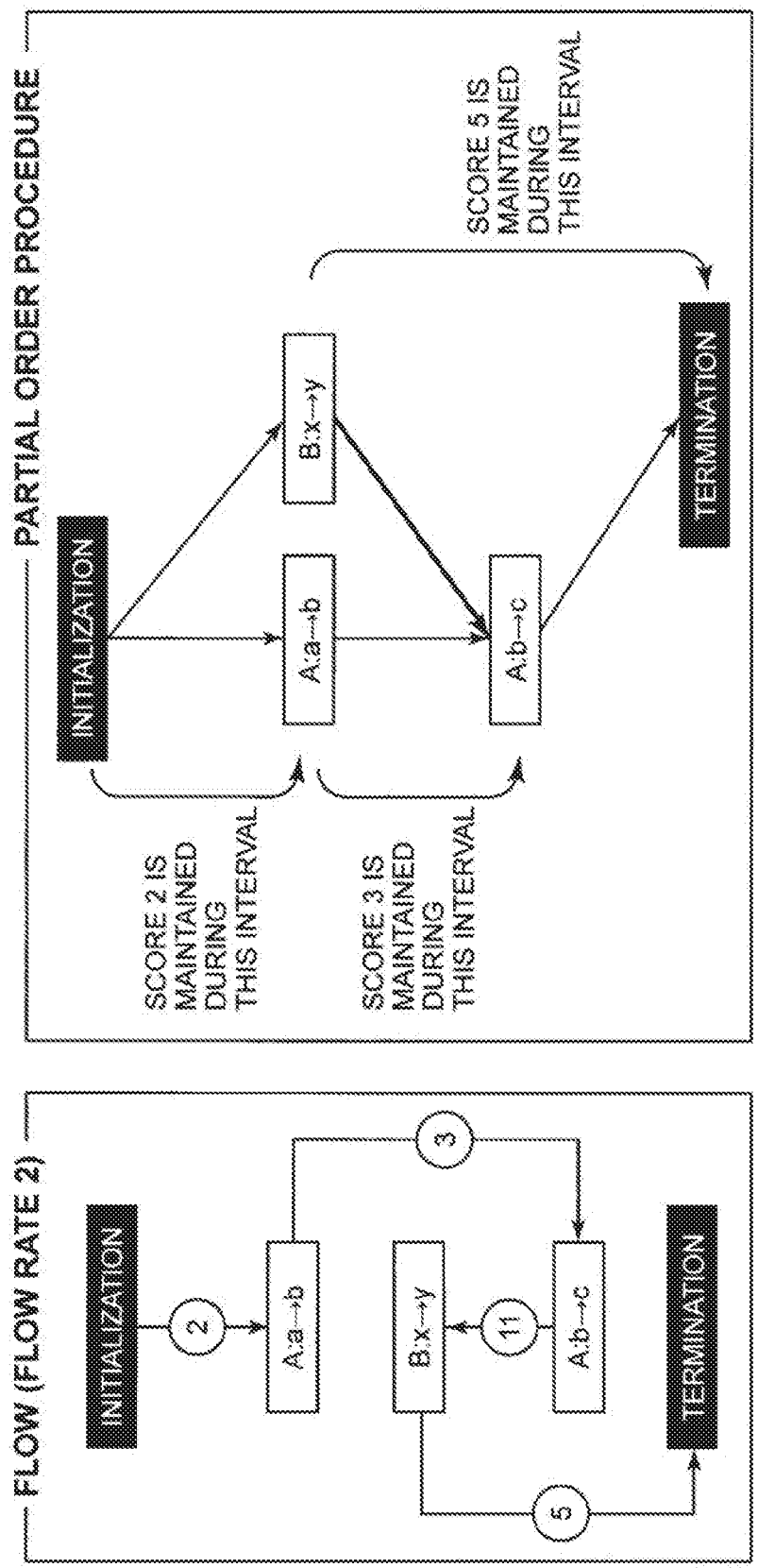
FIG. 13 is an explanatory diagram showing an example of a flow and a partial order procedure.

Hereinafter, a specific example of a flow having a flow rate "2" on the flow network and a partial order procedure generated on the basis of the flow will be described with reference to FIG. 13. FIG. 13 is an explanatory diagram showing an example of a flow and a partial order procedure.

The flow shown in FIG. 13 is a flow having a flow rate "2" on the flow network shown in FIG. 11. The partial order procedure shown in FIG. 13 is a partial order procedure in which the edge ("B: x→y"→"A: b→c") is left so that the flow shown in FIG. 13 passes through the flow network shown in FIG. 11.

Referring to the partial order procedure shown in FIG. 13, the presence of an edge ("B: x→y"→"A: b→c") would ensure that the "interval in which score"2"is maintained" by state element A overlaps with the "interval in which the score" 5 is maintained" by the state element B. That is, it is confirmed that the score "2" is always maintained in the interval from the initialization action to the termination action.

The above has described establishment of the proposition "a partial order procedure having a flow of flow rate being the lower limit value L or more satisfies the transient requirement". The reverse of the above proposition, "the flow of a flow rate being the lower limit value L or more exists in the partial order procedure satisfying the transient requirement" is similarly established.

In order to prove that the opposite of the above proposition holds, outline of proving that the contraposition of the above proposition "the partial order procedure not including a flow with a flow rate being the lower limit value L or more would not satisfy the transient requirement" holds will be described below.

Here is an assumed case where there is no flow with a flow rate being the lower limit value L or more in a partial order procedure iP. When "there is no flow with a flow rate being the lower limit value L or more" according to the "maximum flow/minimum cut theorem", which is the basic theorem of network flow theory, then, it is determined that "the cut capacity of the minimum cut is less than L".

Furthermore, there might be a conceivable case of implementing a state in which only actions included in a minimum cut MC, which is a minimum cut MC on the partial order procedure, are executed while satisfying the dependency. The total score in the state where only the actions included in the minimum cut MC are executed is equal to the capacity of the minimum cut MC.

That is, depending on the order in which the partial order procedure is executed, a state where the total score is less than L would be implemented. In a case where the state where the total score is less than L is implemented, the partial order procedure iP would not satisfy the transient requirement.

Next, the transient requirement satisfaction restriction generation unit 104 generates an integer programming restriction expression representing an existence condition of a flow with a flow rate being the lower limit value or more of the input transient requirement in the converted flow network (step S122).

There is a generally known method that allows the flow existence condition to be reduced to linear restrictions (hereinafter referred to as flow existence restrictions) by assigning a flow variable f indicating the flow rate for each of edges. The flow existence restriction will be described with reference to FIG. 14.

FIG. 14 is an explanatory diagram showing an example of a flow existence restriction. In a case where the flow variable f (a→b) representing the flow rate value is set for each of edges (a→b), the first restriction imposed on the flow variable is the above-described "flow is the capacity or less". The flow existence restriction shown in the upper of FIG. 14 corresponds to the restriction that "the flow rate is the capacity or less".

The second restriction imposed on the flow variable is the above-described "the sum of the inflow amount and the sum of the outflow amount of each of nodes (other than the start point and end point) are equal". The flow existence restriction shown in the bottom of FIG. 14 corresponds to the restriction that "the sum of the inflow amount is equal to the sum of the outflow amount of each of nodes".

The assignment of a value to the flow variable f that satisfies all of the above flow existence restrictions and one flow on the flow network have a one-to-one correspondence.

In step S122, the transient requirement satisfaction restriction generation unit 104 first generates a flow existence restriction. Next, the transient requirement satisfaction restriction generation unit 104 adds a restriction representing the relation between the variable x input from the variable generation unit 102 and the newly introduced variable f, to the generated flow existence restriction.

The restriction to be added is a restriction that the Across edge need to be left even after partial ordering when at least a small amount flow is passing on the Across edge. When an original order relationship r has been converted into an edge r' in the flow network, the above restriction is expressed as "f(r')>0=>x(r)=1".

Furthermore, when a sufficiently large value set as the upper limit value of r' is c, the above restriction expression is expressed by an integer programming restriction expression "c×x(r)−f(r')≥0".

The restriction group obtained in step S122 is the final output of the transient requirement satisfaction restriction generation unit 104. The transient requirement satisfaction restriction generation unit 104 inputs a group of restrictions obtained in step S122 to the restriction resolving unit 105.

Next, operation of the restriction resolving unit 105 will be described. The restriction resolving unit 105 forms an integer programming problem by adding an objective function to the integer programming restriction expressions input from the dependency restriction generation unit 103 and the transient requirement satisfaction restriction generation unit 104. Next, the restriction resolving unit 105 obtains a solution of the integer programming problem using an integer programming solver (not shown).

The objective function that the restriction resolving unit 105 adds to the integer programming restriction expression is the sum of the variables input from the variable generation unit 102. As described above, the variable input from the variable generation unit 102 represents which edge is to be adopted in the partial order procedure out of the edges representing the order relationship.

The edge to be adopted is represented by "1", and the edge not to be adopted is represented by "0". That is, obtaining an assignment with the minimum sum of variables corresponds to obtaining a partial order procedure with the smallest structure out of the partial order procedures satisfying the dependency and transient requirements.

The restriction resolving unit 105 inputs the formed integer programming problem to the integer programming solver and obtains a solution of the integer programming problem. Next, the restriction resolving unit 105 inputs the obtained solution to the integer programming problem to the partial order processing unit 106.

The partial order processing unit 106 operates as described above, and sets up a partial order procedure on the basis of the input.

[Description of Effects]

The partial order procedure planning device 100 of the present exemplary embodiment is a partial order procedure planning device that derives a partial order procedure that is a solution of an automated planning problem on a state element model with transient requirements. The partial order procedure planning device 100 adopts an order relationship that satisfies the minimum restriction on the basis of the transient requirement and the serial procedure in the partial order procedure.

The partial order procedure planning device 100 outputs a procedure with a smallest structure among procedures in which all the actions included in the procedure satisfy the dependency and that obey the conditions for the normal execution and the necessary and sufficient conditions for the procedure to satisfy the transient requirements.

Specifically, the dependency restriction generation unit 103 outputs, as an integer programming restriction expression, a necessary and sufficient condition for all actions included in the procedure to satisfy the dependency and be executed normally. In addition, the transient requirement satisfaction restriction generation unit 104 outputs a necessary and sufficient condition for the procedure to satisfy the transient requirement, as an integer programming restriction expression.

In addition, the restriction resolving unit 105 derives a procedure having the smallest structure among the procedures that satisfy the restrictions output by the dependency restriction generation unit 103 and the transient requirement satisfaction restriction generation unit 104. In addition, the partial order processing unit 106 removes an order relationship unnecessary for normal execution of the procedure from the serial procedure, and generates a partial order procedure.

The partial order processing unit 106 generates a partial order procedure by removing the order relationship other than the order relationship required to satisfy the transient requirement and the transition condition from the serial procedure. Accordingly, the procedure can be executed in parallel, leading to the reduction of the time required for executing the procedure.

Second Exemplary Embodiment

[Description of Configuration]

Figure 15:
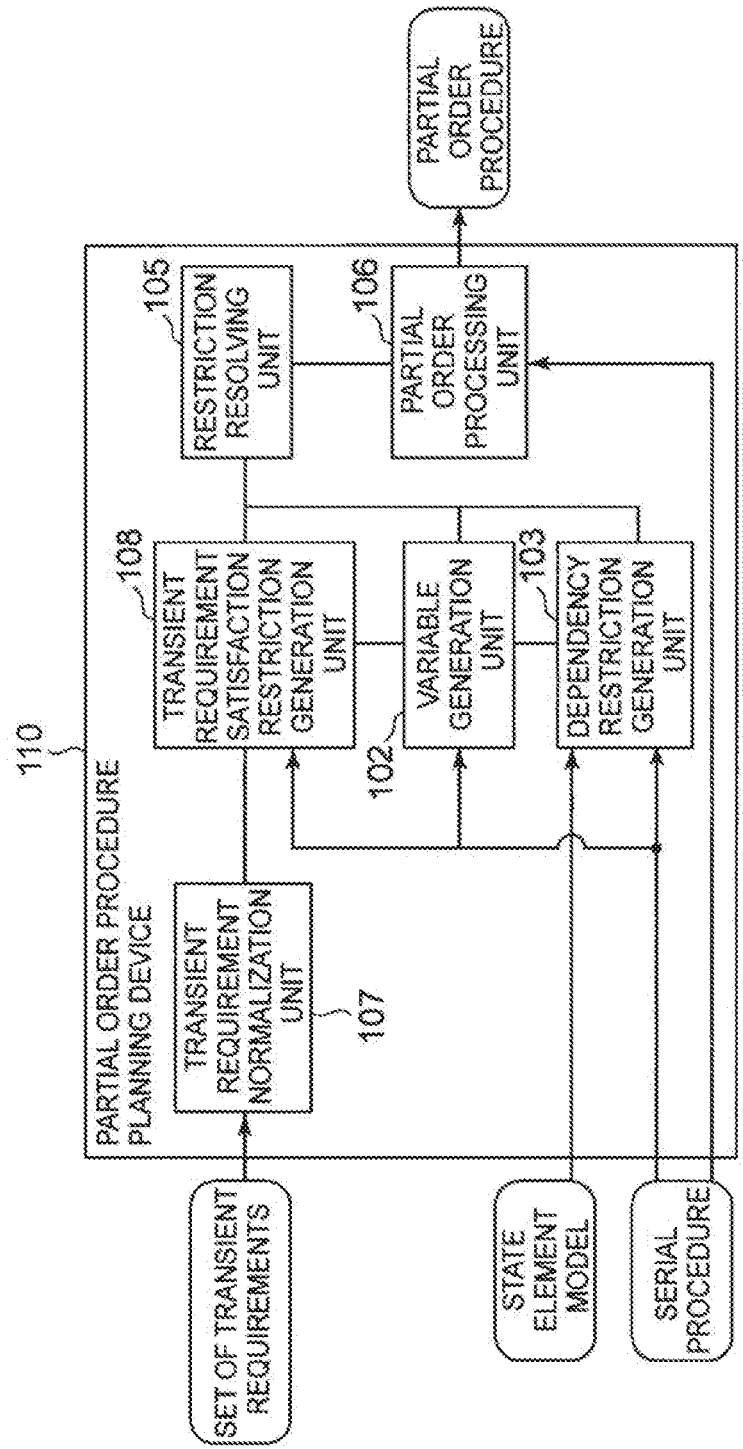
FIG. 15 is a block diagram showing a configuration example of a partial order procedure planning device according to a second exemplary embodiment of the present invention.

Next, a second exemplary embodiment of the present invention will be described with reference to the drawings. FIG. 15 is a block diagram showing a configuration example of a partial order procedure planning device according to the second exemplary embodiment of the present invention.

The configuration of the partial order procedure planning device 110 of the present exemplary embodiment is a configuration in which a part of the configuration of the partial order procedure planning device 100 of the first exemplary embodiment is changed so that a plurality of transient requirements are handled.

As shown in FIG. 15, a partial order procedure planning device 110 of the present exemplary embodiment includes a transient requirement normalization unit 107, a variable generation unit 102, a dependency restriction generation unit 103, a transient requirement satisfaction restriction generation unit 108, a restriction resolving unit 105 and a partial order processing unit 106.

The configuration of the partial order procedure planning device 110 according to the present exemplary embodiment is similar to the configuration of the partial order procedure planning device 100 according to the first exemplary embodiment except that the transient requirement normalization unit 101 is replaced with a transient requirement normalization unit 107, and the transient requirement satisfaction restriction generation unit 104 is replaced with a transient requirement satisfaction restriction generation unit 108.

Unlike the partial order procedure planning device 100 of the first exemplary embodiment, the partial order procedure planning device 110 of the present exemplary embodiment receives a set of transient requirements as an input instead of the transient requirements.

The transient requirement normalization unit 107 of the present exemplary embodiment performs the transient requirement normalization processing shown in FIG. 3 on all transient requirements given. After executing the transient requirement normalization processing, the transient requirement normalization unit 107 inputs all of the normalized transient requirements, as outputs, to the transient requirement satisfaction restriction generation unit 108.

The transient requirement satisfaction restriction generation unit 108 of the present exemplary embodiment executes the transient requirement satisfaction restriction generation processing shown in FIG. 9 for all transient requirements included in the set of input transient requirements, and thereby generates a transient requirement satisfaction restriction. After executing the transient requirement satisfaction restriction generation processing, the transient requirement satisfaction restriction generation unit 108 inputs a restriction expression derived from each of transient requirements, to the restriction resolving unit 105 as an output.

As described in the first exemplary embodiment, the partial order procedure that satisfies the restriction obtained from the transient requirement by executing the transient requirement satisfaction restriction generation processing shown in FIG. 9 also satisfies the transient requirement of the generation source. That is, the partial order procedure that satisfies all the restrictions obtained from a plurality of transient requirements by executing the transient requirement satisfaction restriction generation processing shown in FIG. 9 satisfies all the transient requirements of the generation source.

[Description of Effects]

The partial order procedure planning device 110 according to the present exemplary embodiment outputs a procedure with a smallest structure among procedures in which all the actions included in the procedure satisfy the dependency and that obey the conditions for the normal execution and the necessary and sufficient conditions for the procedure to satisfy the plurality of transient requirements.

Specifically, the transient requirement satisfaction restriction generation unit 108 outputs a necessary and sufficient condition for the procedure to satisfy the all the input transient requirements, as an integer programming restriction expression. In addition, the restriction resolving unit 105 derives a procedure having the smallest structure among the procedures that satisfy the restrictions output by the dependency restriction generation unit 103 and the transient requirement satisfaction restriction generation unit 108.

In addition, the partial order processing unit 106 removes an order relationship unnecessary for normal execution of the procedure from the serial procedure, and generates a partial order procedure. Accordingly, the procedure can be executed in parallel, leading to the reduction of the time required for executing the procedure.

Figure 16:
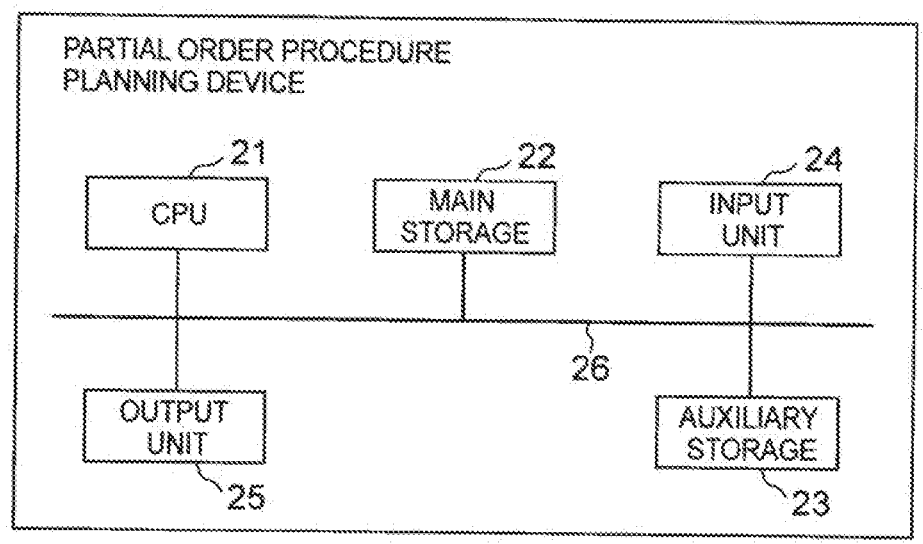
FIG. 16 is an explanatory diagram showing a hardware configuration example of a partial order procedure planning device according to the present invention.

Hereinafter, a specific example of a hardware configuration of the partial order procedure planning device of the present exemplary embodiment will be described. FIG. 16 is an explanatory diagram showing a hardware configuration example of the partial order procedure planning device according to the present invention.

The partial order procedure planning device shown in FIG. 16 includes a central processing unit (CPU) 21, a main storage 22, and an auxiliary storage 23. Furthermore, the device may include an input unit 24 for the user to operate and an output unit 25 for presenting the processing result or the progress of the processing content to the user.

The partial order procedure planning device shown in FIG. 16 may include a digital signal processor (DSP) instead of the CPU 21. Alternatively, the partial order procedure planning device shown in FIG. 16 may include both the CPU 21 and the DSP.

The main storage 22 is used as a data working area and a temporary data save area. The main storage 22 is implemented by random access memory (RAM).

The auxiliary storage 23 is a tangible storage medium that is not temporary. Examples of the tangible storage medium that is not temporary include a magnetic disk, a magneto-optical disk, a Compact Disk Read Only Memory (CD-ROM), a Digital Versatile Disk Read Only Memory (DVD-ROM), and a semiconductor memory.

The input unit 24 has a function of inputting data and processing instructions. The input unit 24 is an input device such as a keyboard or a mouse.

The output unit 25 has a function of outputting data. The output unit 25 is a display device such as a liquid crystal display device or a printing device such as a printer.

In addition, as shown in FIG. 16, individual components of the partial order procedure planning device are connected to a system bus 26.

The auxiliary storage 23 stores a program for implementing, for example, the transient requirement normalization unit 101, the variable generation unit 102, the dependency restriction generation unit 103, the transient requirement satisfaction restriction generation unit 104, the restriction resolving unit 105, the partial order processing unit 106, the transient requirement normalization unit 107, and the transient requirement satisfaction restriction generation unit 108.

In addition, the partial order procedure planning device 100 and the partial order procedure planning device 110 of each of exemplary embodiments may be implemented by the CPU 21 that executes processing in accordance with a program stored in a non-temporary storage medium, for example. That is, the partial order procedure planning device 100 and the partial order procedure planning device 110 of each of exemplary embodiments may be implemented by software.

In a case where the devices are implemented by software, the CPU 21 loads the program stored in the auxiliary storage 23 to the main storage 22 and executes the program to control the operation of the partial order procedure planning device, thereby implementing individual functions by software. That is, the transient requirement normalization unit 101, the variable generation unit 102, the dependency restriction generation unit 103, the transient requirement satisfaction restriction generation unit 104, the restriction resolving unit 105, the partial order processing unit 106, the transient requirement normalization unit 107, and the transient requirement satisfaction restriction generation unit 108 are implemented by the CPU 21 that executes processing in accordance with program control, for example.

In addition, a part or all of individual components may be implemented by a general-purpose circuit (circuitry), a dedicated circuit, a processor, or a combination thereof. These may be configured by a single chip or may be configured by a plurality of chips connected via a bus. Some or all of the components may be implemented by a combination of the above-described circuits or the like and a program.

For example, each unit in the partial order procedure planning device 100 and the partial order procedure planning device 110 of each of the exemplary embodiments may be implemented by a hardware circuit. As an example, the transient requirement normalization unit 101, the variable generation unit 102, the dependency restriction generation unit 103, the transient requirement satisfaction restriction generation unit 104, the restriction resolving unit 105, the partial order processing unit 106, the transient requirement normalization unit 107, and the transient requirement satisfaction restriction generation unit 108 are each implemented by Large Scale Integration (LSI). Alternatively, they may be implemented by one LSI.

When some or all of the constituent elements are implemented by a plurality of information processing devices and circuits, the plurality of information processing devices and circuits may be centrally arranged or distributed. For example, an information processing device, a circuit, or the like may be implemented as a form in which each of a client and server system, a cloud computing system, or the like is connected via a communication network.

Figure 17:
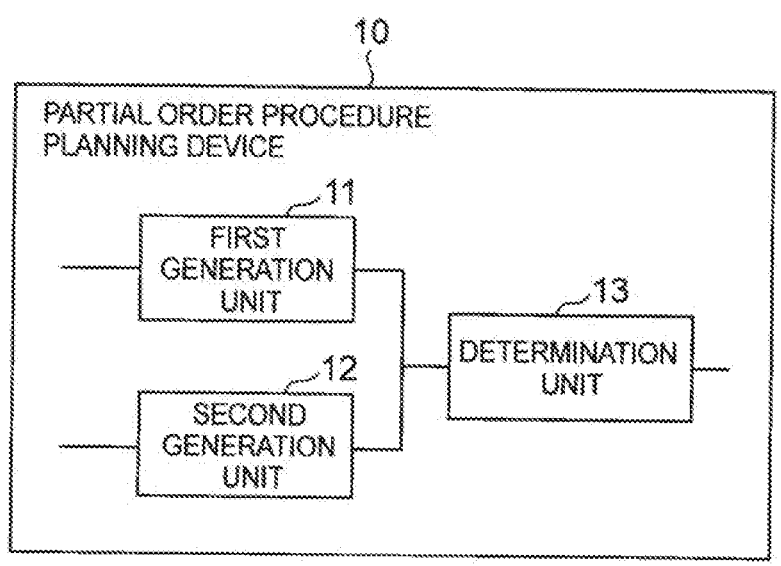
FIG. 17 is a block diagram showing an outline of a partial order procedure planning device according to the present invention.
Figure 18:
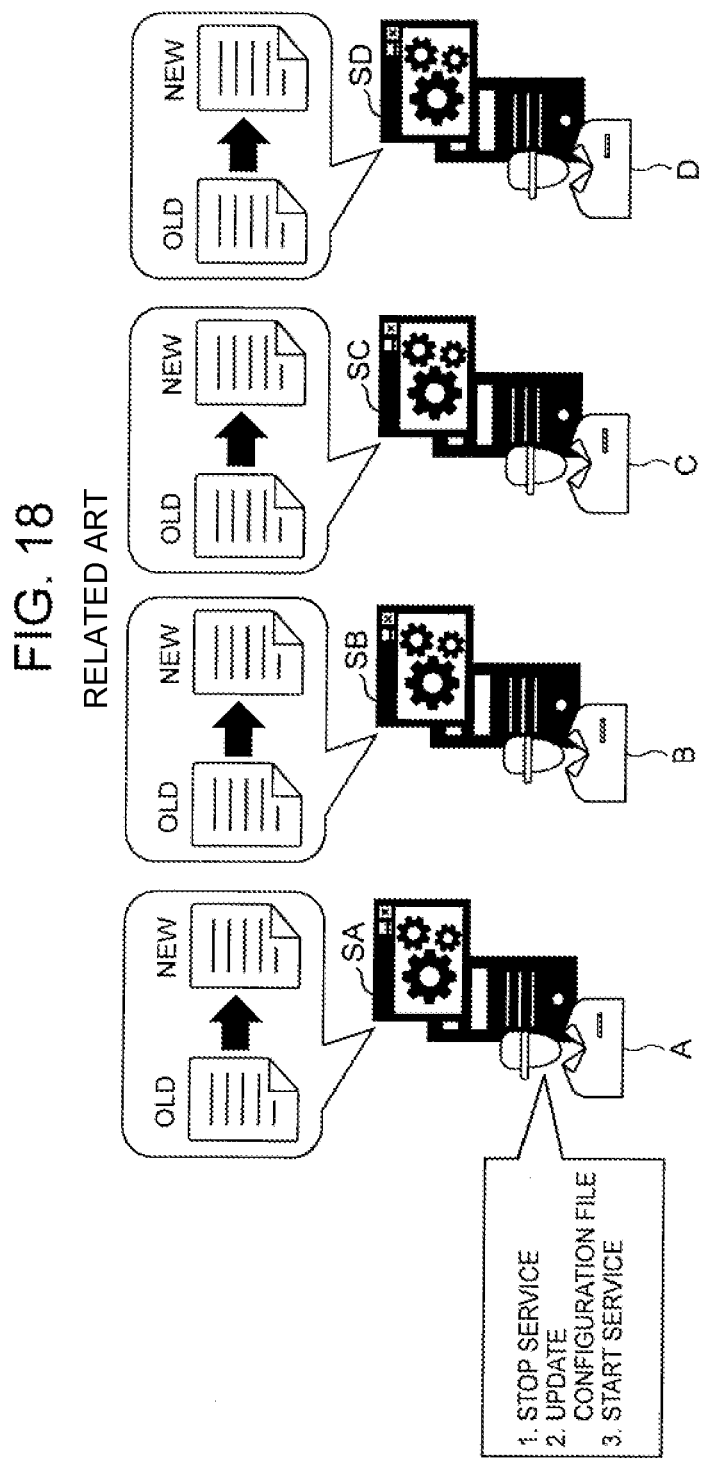
FIG. 18 is an explanatory diagram showing an example of an automated planning problem including a plurality of execution agents.
Figure 19:
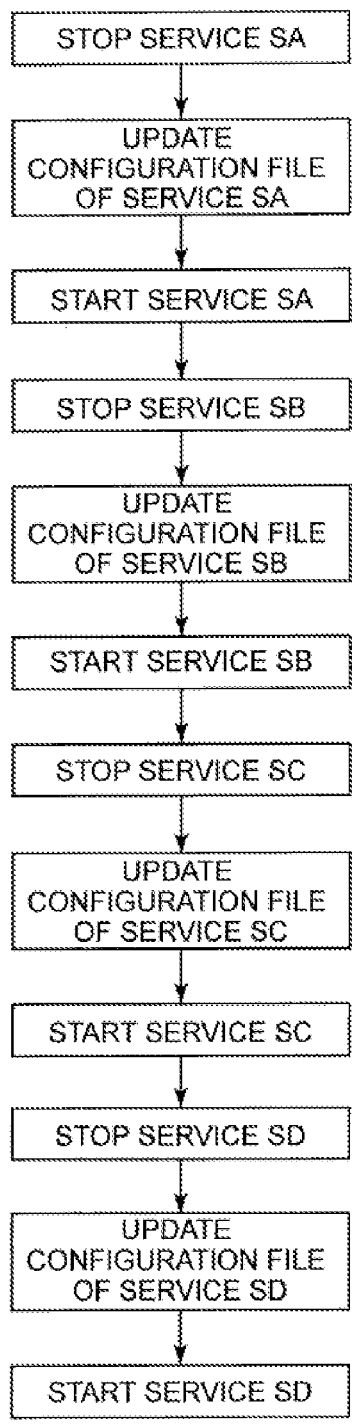
FIG. 19 is an explanatory diagram showing an example of a serial procedure.
Figure 20:
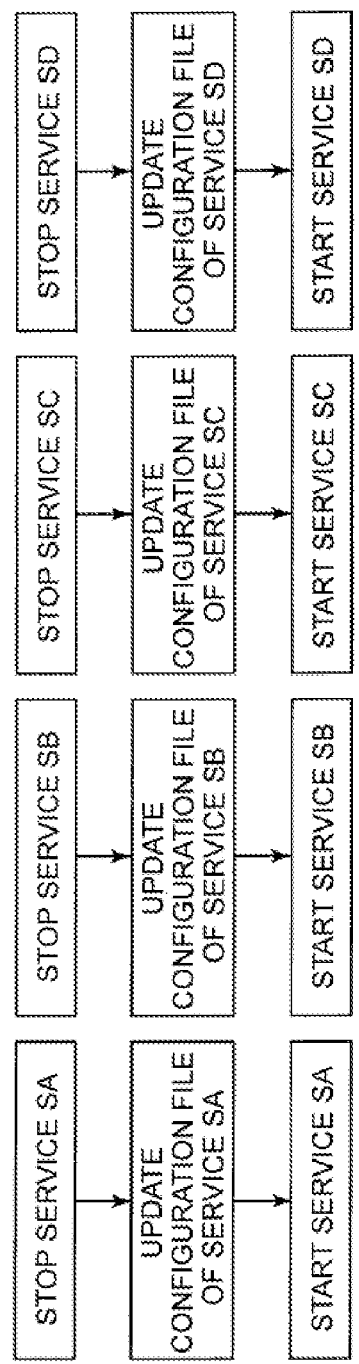
FIG. 20 is an explanatory diagram showing an example of a partial order procedure.
Figure 21:
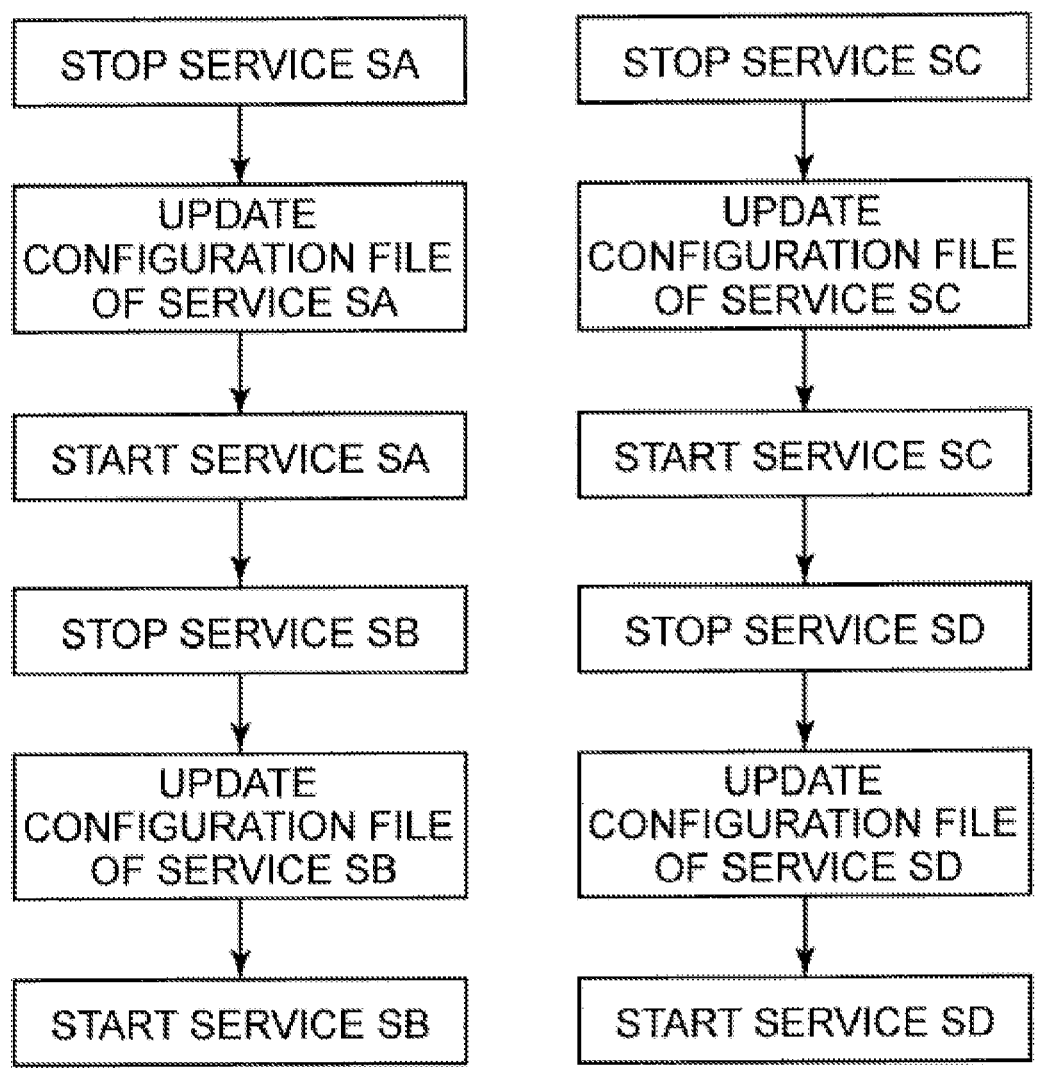
FIG. 21 is an explanatory diagram showing another example of the partial order procedure.
Figure 22:
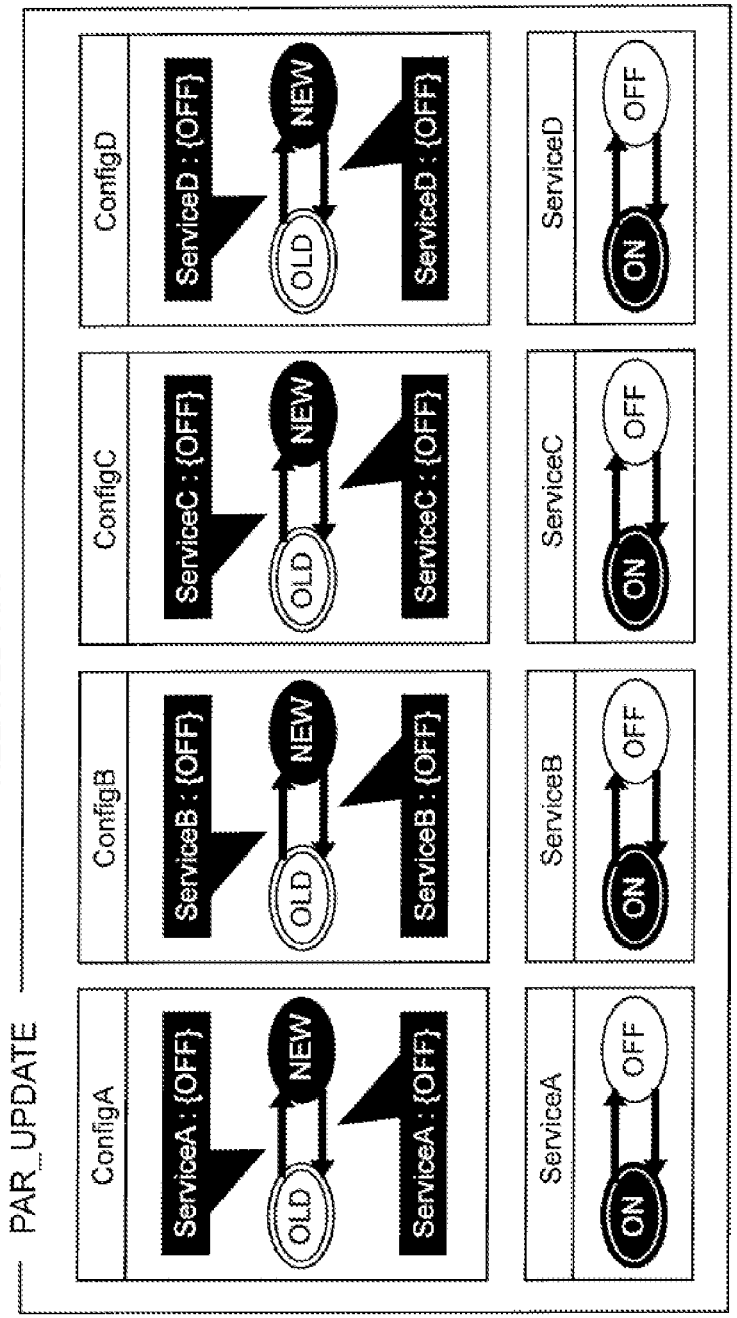
FIG. 22 is an explanatory diagram showing an example of a state element model.

Next, a summary of the present invention will be described. FIG. 17 is a block diagram showing an outline of the partial order procedure planning device according to the present invention. The partial order procedure planning device 10 according to the present invention includes: a first generation unit 11 (for example, the dependency restriction generation unit 103) that generates a first condition of a removable order relationship under a predetermined restriction among order relationships between operations in a serial procedure in which a plurality of operations (for example, actions), which transit the state of a state element from an initial state to a target state, are arranged in series; the second generation unit 12 (for example, the transient requirement satisfaction restriction generation unit 104) that generates a second condition of an order relationship, which is required to satisfy a transient requirement that is required to satisfy the state element while a state among the order relationships is transitioned from the initial state to the target state; and the determination unit 13 (for example, restriction resolving unit 105) that determines, as the order relationship to be deleted from the serial procedure, an order relationship which satisfies the generated first condition, but does not satisfy the generated second condition.

With such a configuration, the partial order procedure planning device can plan a partial order procedure that satisfies transient requirements.

Furthermore, the first generation unit 11 may generate the first condition as an integer programming restriction expression, the second generation unit 12 may generate the second condition as an integer programming restriction expression, and the determination unit 13 may determine the order relationship to be deleted from the serial procedure by solving an integer programming restriction problem that includes the generated integer programming restriction expression.

With such a configuration, the partial order procedure planning device can reduce the problem of generating the partial order procedure to an integer programming restriction problem.

Furthermore, the second generation unit 12 may generate an integer programming restriction expression as a flow existence condition in a network flow on a directed graph corresponding to the serial procedure.

With such a configuration, the partial order procedure planning device can derive an order relationship condition satisfying the transient requirement using a directed graph.

In addition, the transient requirement may include: a score assigned to a state of a state element; and a restriction expression related to a score assigned to the current state of the state element. The transient requirement may include a restriction defining a state in which the state element model is prohibited from transitioning.

With such a configuration, the partial order procedure planning device can reduce the problem of generating the partial order procedure to an integer programming restriction problem.

Further, the partial order procedure planning device 10 may include an update unit (for example, the partial order processing unit 106) that updates the serial procedure by deleting the order relationship determined by the determination unit 13 from the serial procedure. The update unit may update the serial procedure to a procedure in a format in which some operation can be executed in parallel.

With such a configuration, the partial order procedure planning device can plan partial order procedures that can be executed in parallel to satisfy transient requirements.

The partial order procedure planning device 10 may include a normalization unit (for example, the transient requirement normalization unit 101) that normalizes a transient requirement, and the normalization unit may input the normalized transient requirement to the second generation unit 12.

With such a configuration, the partial order procedure planning device can normalize the format of the input transient requirement into a format that can be easily processed.

The state element may include a plurality of states and a state transition to which a transition condition between the plurality of states is attached.

While the invention of the present application has been described with reference to the exemplary embodiments and examples, the invention of the present application is not limited to the above exemplary embodiments and examples. Configuration and details of the invention of the present application can be modified in various manners understandable for those skilled in the art within the scope of the invention of the present application.

This application is based upon and claims the benefit of priority from Japanese Patent Application No. 2017-106367 filed May 30, 2017, the disclosure of which is incorporated herein in its entirety by reference.

INDUSTRIAL APPLICABILITY

The present invention is suitably applied to an application that improves the parallel execution feasibility of a procedure that is a solution of an automated planning problem with a transient requirement on a state element model. For example, the present invention is suitably applied to derivation of efficient procedure in which parallel execution is feasible, such as a solution to an automated planning problem related to a system formed of a plurality of small scale subsystems that interfere with other subsystems and related to global restrictions imposed on the system.

REFERENCE SIGNS LIST 10, 100, 110 Partial order procedure planning device
11 First generation unit
12 Second generation unit
13 Determination unit
21 CPU
22 Main storage
23 Auxiliary storage
24 Input unit
25 Output unit
26 System bus
101, 107 Transient requirement normalization unit
102 Variable generation unit
103 Dependency restriction generation unit
104, 108 Transient requirement satisfaction restriction generation unit
105 Restriction resolving unit
106 Partial order processing unit

What is claimed is:

1. A partial order procedure planning system comprising:
a plurality of servers interconnected via a network;
a first generation unit, comprising one or more processors, which generates a dependency restriction of a plurality of order relationships among a plurality of operations in a serial procedure, wherein the dependency restriction is required to be satisfied during execution of the serial procedure, wherein the serial procedure is a solution of an automated planning problem of the system, wherein the serial procedure transits the state of the system from an initial state to a target state, and wherein a plurality of global restrictions are imposed on the system;
a second generation unit, comprising one or more processors, which generates a requirement satisfaction restriction of any order relationship among the plurality of order relationships, wherein the requirement satisfaction restriction is required to satisfy the state of the system while the state is transitioned from the initial state to the target state;
a determination unit, comprising one or more processors, which determines an order relationship among the plurality of order relationships which satisfies the generated dependency restriction, but does not satisfy the generated requirement satisfaction restriction; and
a partial order processing unit, comprising one or more processors, which deletes the determined order relationship from the plurality of order relationships and generates a partial order procedure, wherein the plurality of servers execute the partial order procedure in parallel.

2. The partial order procedure planning system according to claim 1, wherein the first generation unit generates the dependency restriction as a first integer programming restriction expression, the second generation unit generates the requirement satisfaction restriction as a second integer programming restriction expression, and
wherein the system further comprises a restriction resolving unit comprising one or more processors which solves an integer programming restriction problem that includes the generated first integer programming restriction expression and the generated second integer programming restriction expression.

3. The partial order procedure planning system according to claim 2, wherein the second generation unit generates the second integer programming restriction expression as a flow existence condition in a network flow on a directed graph corresponding to the serial procedure.

4. The partial order procedure planning system according to claim 3, wherein the requirement satisfaction restriction includes:
a score assigned to the state of the system; and
a restriction expression related to the score assigned to the state of the system.

5. The partial order procedure planning system according to claim 3, further comprising a normalization unit, comprising one or more processors, which normalizes the requirement satisfaction restriction, wherein the normalization unit inputs the normalized requirement satisfaction restriction to the second generation unit.

6. The partial order procedure planning system according to claim 2, wherein the requirement satisfaction restriction includes:
a score assigned to the state of the system; and
a restriction expression related to the score assigned to the state of the system.

7. The partial order procedure planning system according to claim 2, further comprising a normalization unit, comprising one or more processors, which normalizes the requirement satisfaction restriction, wherein the normalization unit inputs the normalized requirement satisfaction restriction to the second generation unit.

8. The partial order procedure planning system according to claim 1, wherein the requirement satisfaction restriction includes:
a score assigned to the state of the system; and
a restriction expression related to the score assigned to the state of the system.

9. The partial order procedure planning system according to claim 8, further comprising a normalization unit, comprising one or more processors, which normalizes the requirement satisfaction restriction, wherein the normalization unit inputs the normalized requirement satisfaction restriction to the second generation unit.

10. The partial order procedure planning system according to claim 1, further comprising a normalization unit, comprising one or more processors, which normalizes the requirement satisfaction restriction, wherein the normalization unit inputs the normalized requirement satisfaction restriction to the second generation unit.

11. A partial order procedure planning method executed by a system comprising a plurality of servers interconnected via a network, the method comprising:
generating a dependency restriction of a plurality of order relationships among a plurality of operations in a serial procedure, wherein the dependency restriction is required to be satisfied during execution of the serial procedure, wherein the serial procedure is a solution of an automated planning problem of the system, wherein the serial procedure transits the state of the system from an initial state to a target state, and wherein a plurality of global restrictions are imposed on the system;

generating a requirement satisfaction restriction of any order relationship among the plurality of order relationships, wherein the requirement satisfaction restriction is required to satisfy the state of the system while the state is transitioned from the initial state to the target state;

determining, an order relationship among the plurality of order relationships which satisfies the generated dependency restriction, but does not satisfy the generated requirement satisfaction restriction;

deleting the determined order relationship from the plurality of order relationships; and generating a partial order procedure, wherein the plurality of servers execute the partial order procedure in parallel.

12. The computer-implemented partial order procedure planning method according to claim 11, the method further comprising:

generating the dependency restriction as a first integer programming restriction expression;

generating the requirement satisfaction restriction as a second integer programming restriction expression; and solving an integer programming restriction problem that includes the generated first integer programming restriction expression and the generated second integer programming restriction expression.

13. A non-transitory computer-readable storage medium including a partial order procedure planning program that causes a system comprising plurality of servers interconnected via a network to execute processing comprising:

generating a dependency restriction of a plurality of order relationships among a plurality of operations in a serial procedure, wherein the dependency restriction is required to be satisfied during execution of the serial procedure, wherein the serial procedure is a solution of an automated planning problem of the system, wherein the serial procedure transits the state of the system from an initial state to a target state, and wherein a plurality of global restrictions are imposed on the system;

generating a requirement satisfaction restriction of any order relationship among the plurality of order relationships, wherein the requirement satisfaction restriction is required to satisfy the state of the system while the state is transitioned from the initial state to the target state;

determining an order relationship among the plurality of order relationships which satisfies the generated dependency restriction, but does not satisfy the generated requirement satisfaction restriction;

deleting the determined order relationship from the plurality of order relationships; and generating a partial order procedure, wherein the plurality of servers execute the partial order procedure in parallel.

14. The medium according to claim 13, that causes the system to execute processing further comprising:

generating the dependency restriction as a first integer programming restriction expression in the first generation processing;

generating the requirement satisfaction restriction as a second integer programming restriction expression in the second generation processing; and solving an integer programming restriction problem that includes the generated first integer programming restriction expression and the generated second integer programming restriction expression.

\* \* \* \* \*